United States Patent
Yoshizawa

(10) Patent No.: US 10,342,003 B2
(45) Date of Patent: Jul. 2, 2019

(54) DEVICE AND METHOD AND PROGRAM FOR PERFORMING RADIO COMMUNICATION

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/566,778

(22) PCT Filed: Feb. 23, 2016

(86) PCT No.: PCT/JP2016/055166
§ 371 (c)(1),
(2) Date: Oct. 16, 2017

(87) PCT Pub. No.: WO2016/185747
PCT Pub. Date: Nov. 24, 2016

(65) Prior Publication Data
US 2018/0110031 A1 Apr. 19, 2018

(30) Foreign Application Priority Data
May 20, 2015 (JP) .................................. 2015-102813

(51) Int. Cl.
*H04W 4/00* (2018.01)
*H04W 72/04* (2009.01)
(Continued)

(52) U.S. Cl.
CPC ....... *H04W 72/042* (2013.01); *H04J 13/0007* (2013.01); *H04L 5/0053* (2013.01);
(Continued)

(58) Field of Classification Search
CPC ............... H04J 13/0003; H04J 13/0007; H04J 13/0077; H04J 2013/165; H04L 5/00;
(Continued)

(56) References Cited

U.S. PATENT DOCUMENTS

| 9,713,098 B2* | 7/2017 | Kim .................... H04B 7/0452 |
| 2014/0169408 A1* | 6/2014 | Bayesteh ............. H04B 7/0473 375/144 |

(Continued)

FOREIGN PATENT DOCUMENTS

| JP | 2015-050575 A | 3/2015 |
| WO | 2014/090189 A1 | 6/2014 |
| WO | 2015/015543 A1 | 2/2015 |

OTHER PUBLICATIONS

International Search Report dated Apr. 19, 2016, in PCT/JP2016/055166 filed Feb. 23, 2015.

*Primary Examiner* — Minh Trang T Nguyen
(74) *Attorney, Agent, or Firm* — Xsensus LLP

(57) ABSTRACT

To enable low latency uplink to be used in a more preferable mode can be provided. A device includes: a communication unit configured to perform radio communication; and a control unit configured to perform control such that control information is transmitted from the communication unit to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

14 Claims, 21 Drawing Sheets

(51) Int. Cl.
*H04W 76/10* (2018.01)
*H04W 72/14* (2009.01)
*H04J 13/00* (2011.01)
*H04L 5/00* (2006.01)
*H04J 13/16* (2011.01)

(52) U.S. Cl.
CPC ..... *H04W 72/044* (2013.01); *H04W 72/0413* (2013.01); *H04W 72/14* (2013.01); *H04W 76/10* (2018.02); *H04J 13/0003* (2013.01); *H04J 13/0077* (2013.01); *H04J 2013/165* (2013.01); *H04L 5/0023* (2013.01)

(58) Field of Classification Search
CPC ........... H04W 72/0413; H04W 72/042; H04W 72/044; H04W 72/14; H04W 76/10
See application file for complete search history.

(56) References Cited

U.S. PATENT DOCUMENTS

| | | | |
|---|---|---|---|
| 2014/0254544 A1 | 9/2014 | Kar Kin Au et al. | |
| 2015/0171983 A1* | 6/2015 | Kusashima | H04J 11/004 370/329 |
| 2015/0282185 A1* | 10/2015 | Nikopour | H04L 1/0002 370/329 |

* cited by examiner

FIG. 3

CODEBOOK 1
$(0,0) \rightarrow x_{11} = (x_{111}, x_{112}, 0, 0)$
$(0,1) \rightarrow x_{12} = (x_{121}, x_{122}, 0, 0)$
$(1,0) \rightarrow x_{13} = (x_{131}, x_{132}, 0, 0)$
$(1,1) \rightarrow x_{14} = (x_{141}, x_{142}, 0, 0)$ CODEBOOK 2
$(0,0) \rightarrow x_{21} = (0, 0, x_{213}, x_{214})$
$(0,1) \rightarrow x_{22} = (0, 0, x_{223}, x_{224})$
$(1,0) \rightarrow x_{23} = (0, 0, x_{233}, x_{234})$
$(1,1) \rightarrow x_{24} = (0, 0, x_{243}, x_{244})$ CODEBOOK 3
$(0,0) \rightarrow x_{31} = (x_{311}, 0, x_{313}, 0)$
$(0,1) \rightarrow x_{32} = (x_{321}, 0, x_{323}, 0)$
$(1,0) \rightarrow x_{33} = (x_{331}, 0, x_{333}, 0)$
$(1,1) \rightarrow x_{34} = (x_{341}, 0, x_{343}, 0)$ CODEBOOK 4
$(0,0) \rightarrow x_{41} = (0, x_{412}, 0, x_{414})$
$(0,1) \rightarrow x_{42} = (0, x_{422}, 0, x_{424})$
$(1,0) \rightarrow x_{43} = (0, x_{432}, 0, x_{434})$
$(1,1) \rightarrow x_{44} = (0, x_{442}, 0, x_{444})$ CODEBOOK 5
$(0,0) \rightarrow x_{51} = (x_{511}, 0, 0, x_{514})$
$(0,1) \rightarrow x_{52} = (x_{521}, 0, 0, x_{524})$
$(1,0) \rightarrow x_{53} = (x_{531}, 0, 0, x_{534})$
$(1,1) \rightarrow x_{54} = (x_{541}, 0, 0, x_{544})$ CODEBOOK 6
$(0,0) \rightarrow x_{61} = (0, x_{612}, x_{613}, 0)$
$(0,1) \rightarrow x_{62} = (0, x_{622}, x_{623}, 0)$
$(1,0) \rightarrow x_{63} = (0, x_{632}, x_{633}, 0)$
$(1,1) \rightarrow x_{64} = (0, x_{642}, x_{643}, 0)$

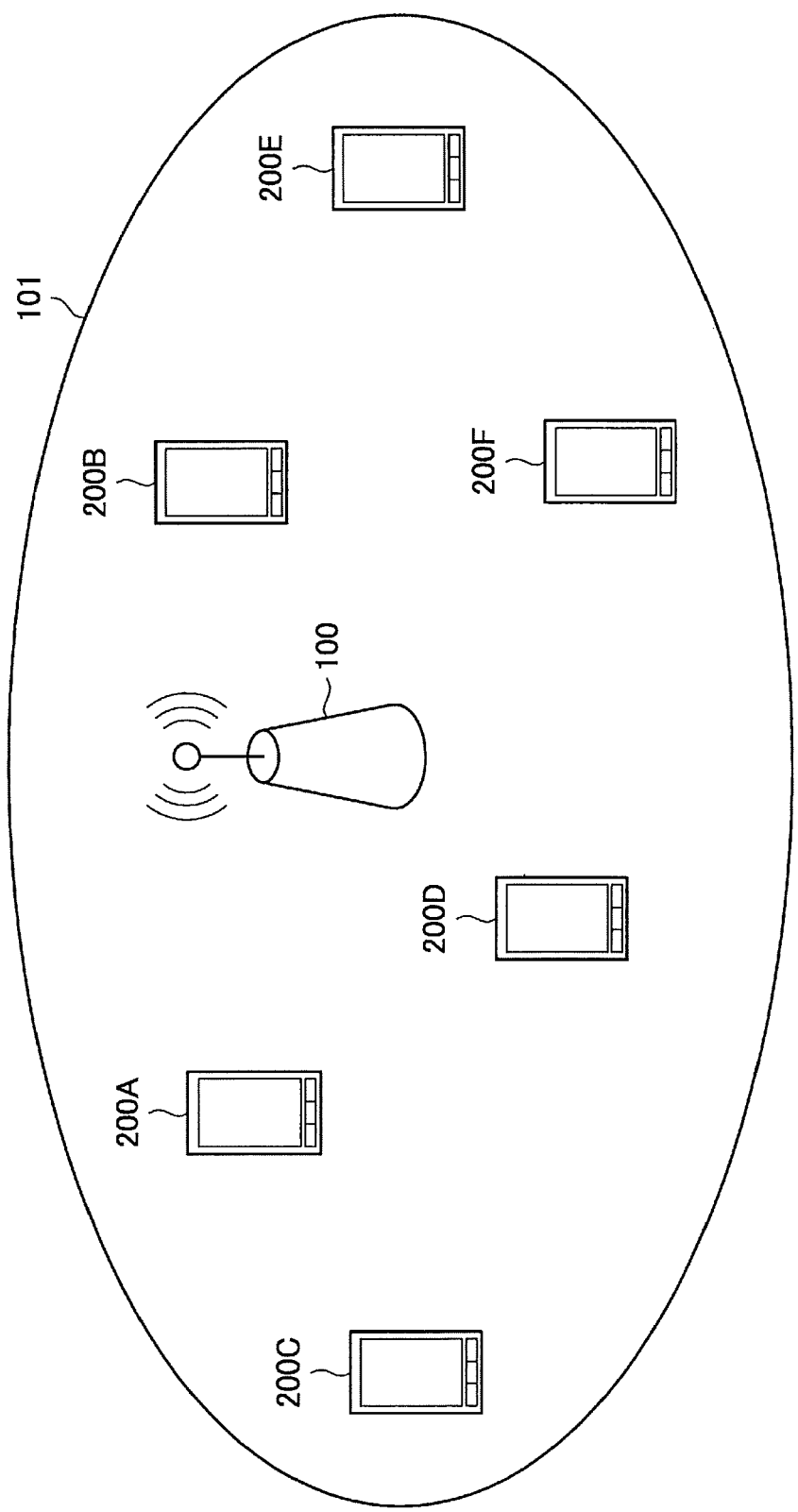

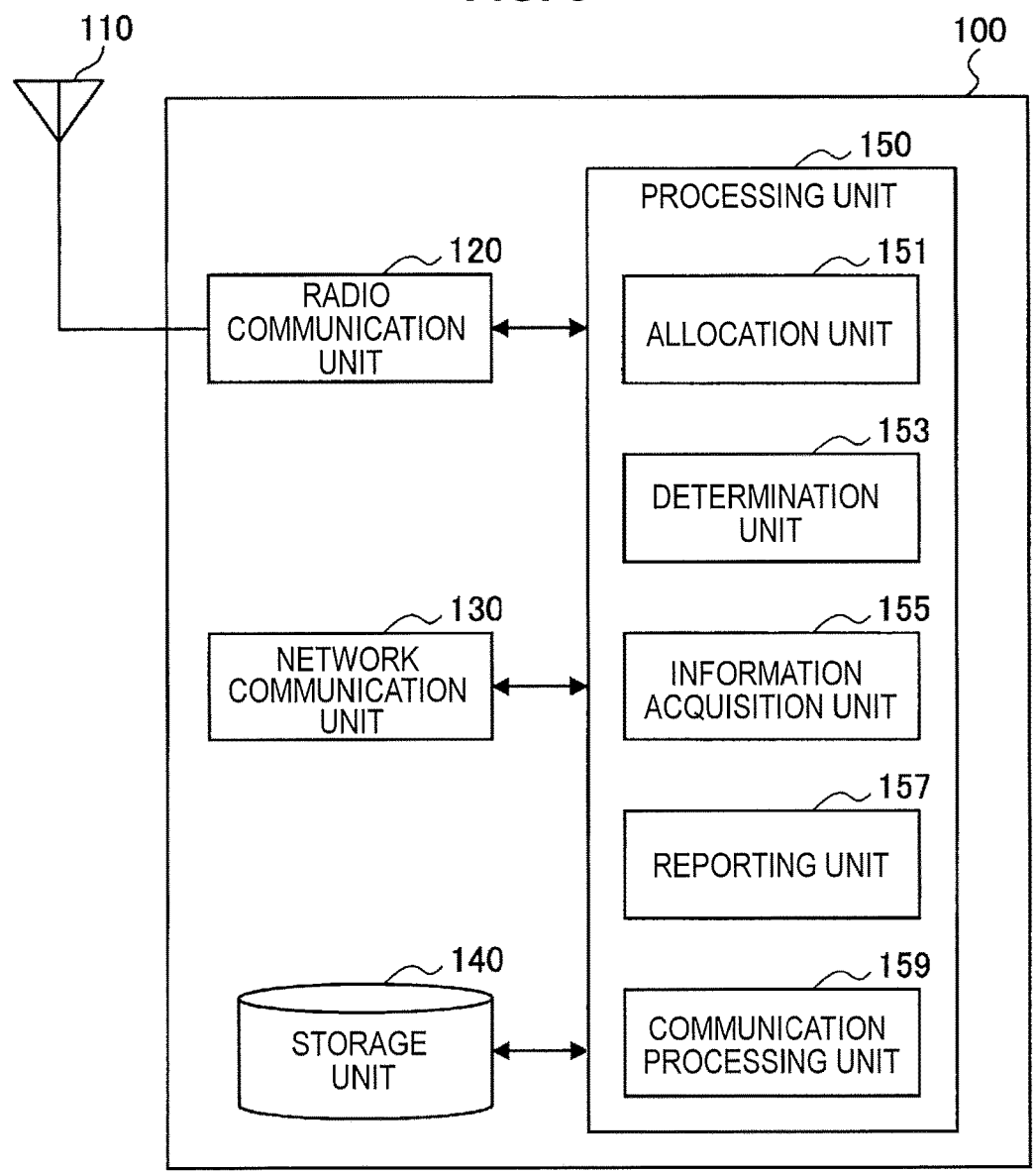

FIG. 9

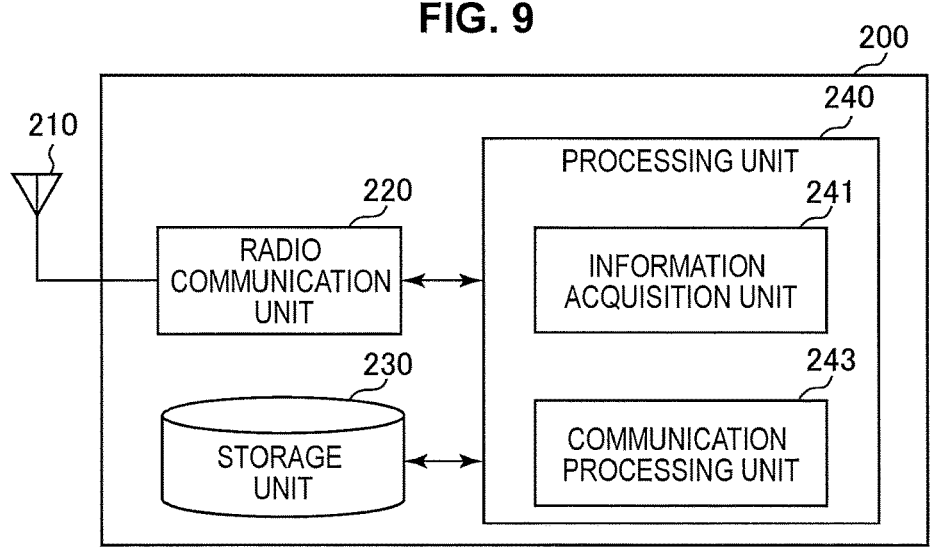

FIG. 10

| NAME OF INFORMATION | PARAMETER |
| --- | --- |
| RADIO RESOURCE FOR LOW LATENCY UPLINK | CYCLE, OFFSET, FRAME, SUBFRAME NUMBER, ETC. |
| | SUBCARRIER, RESOURCE BLOCK INFORMATION, ETC. |
| TIMER VALUE | DURATION, START TIME, END TIME, ETC. OF LOW LATENCY COMMUNICATION |
| RESTRICTION INFORMATION | ARP, QCI, ESTABLISHMENT CAUSE, ACCESS CLASS, OTHERS, ID INDICATING CATEGORY OR TYPE OF APPLICATION, ETC. |

FIG. 11

| NAME OF INFORMATION | PARAMETER |
| --- | --- |
| LATENCY LEVEL | DESIRED DELAY TIME OR NUMERICAL VALUE INDICATING DEGREE |
| IMPORTANCE | NUMERICAL VALUE INDICATING LEVEL OF URGENCY OF NECESSITY OF LOW LATENCY COMMUNICATION, ETC. |
| IDENTIFIER | BEARER ID USED BY APPLICATION THAT IS SUBJECT OF LOW LATENCY COMMUNICATION, ID INDICATING ATTRIBUTE OF APPLICATION, ETC. |
| CANDIDATES FOR CODEBOOK | INDEX OF CODEBOOK OF SCMA TO BE USED IN LOW LATENCY COMMUNICATION, ETC. |

FIG. 12

| NAME OF INFORMATION | PARAMETER |
|---|---|
| TIMER VALUE | FINAL TIMER VALUE DESIGNATED BY BASE STATION |
| LATENCY LEVEL | FINAL LATENCY LEVEL DESIGNATED BY BASE STATION |
| IMPORTANCE | LEVEL OF URGENCY DETERMINED BY BASE STATION |

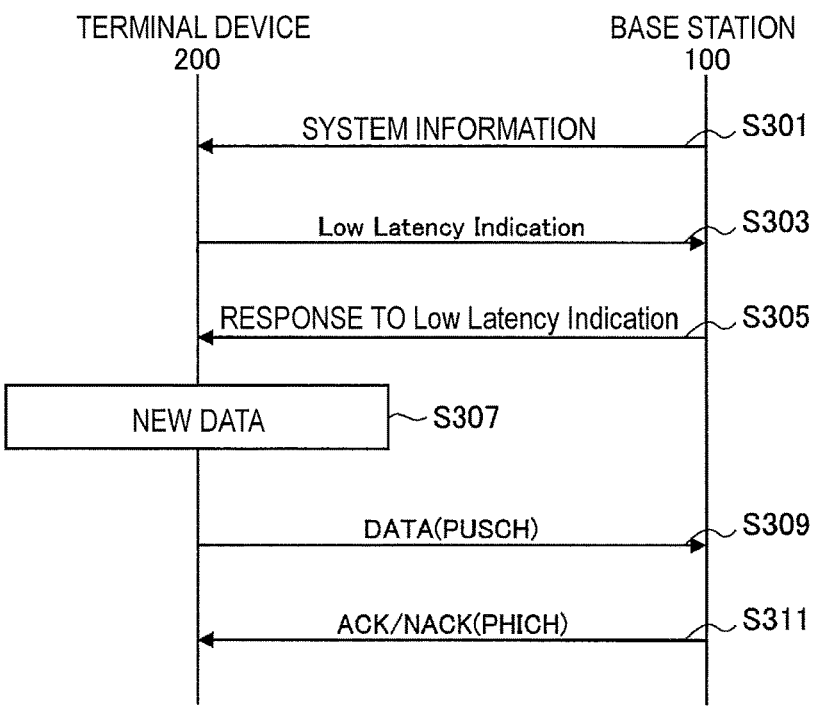
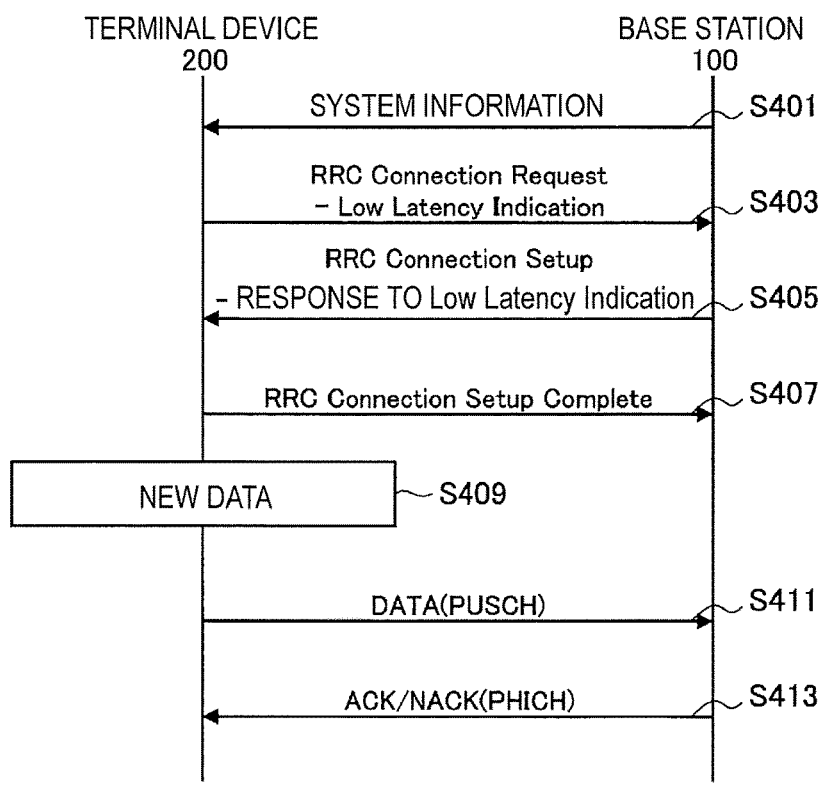

DEVICE AND METHOD AND PROGRAM FOR PERFORMING RADIO COMMUNICATION

TECHNICAL FIELD

The present invention relates to a device, a method, and a program.

BACKGROUND ART

In recent years, various new radio access schemes have been discussed in various fields for the next fifth generation radio scheme of Long Term Evolution (LTE). In particular, non-orthogonal multiplexing and non-orthogonal multiple access have been discussed. Amid this situation, a new multiple access scheme called sparse code multiple access (SCMA) has been proposed.

In SCMA, resources can be shared between a plurality of layers (i.e., a plurality of users) by demodulating data, which has been non-orthogonally multiplexed for the plurality of layers, through cancellation of interference between the layers.

CITATION LIST

Patent Literature

Patent Literature 1: US 2014/0254544A

DISCLOSURE OF INVENTION

Technical Problem

In addition, realization of communication in which latency is further reduced (i.e., low latency communication) has been discussed as a task of $5^{th}$ generation cellular communication. For example, Patent Literature 1 discloses an example of a communication scheme for realizing low latency uplink. In the communication scheme disclosed in Patent Literature 1, low latency uplink is realized by transmitting data without allocation of radio resources through an uplink grant from a base station using a communication scheme such as SCMA, in which data, which has been non-orthogonally multiplexed for a plurality of layers, is demodulated through cancellation of interference between the layers.

Therefore, considering the above-described circumstances, the present disclosure proposes a device, a method, and a program which enable low latency uplink to be used in a more preferable mode.

Solution to Problem

According to the present disclosure, there is provided a device including: a communication unit configured to perform radio communication; and a control unit configured to perform control such that control information is transmitted from the communication unit to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

In addition, according to the present disclosure, there is provided a device including: a communication unit configured to perform radio communication; and an acquisition unit configured to acquire control information from a base station via the radio communication, the control information indicating that a communication scheme in which data non-orthogonally multiplexed for a plurality of layers is demodulated through cancellation of interference between the layers and in which the data is transmitted from a terminal to the base station through a predetermined uplink resource, is available.

In addition, according to the present disclosure, there is provided a method including: performing radio communication; and performing control, by a processor, such that control information is transmitted to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

In addition, according to the present disclosure, there is provided a method including: performing radio communication; and acquiring, by a processor, control information from the base station via the radio communication, the control information indicating that a communication scheme in which data non-orthogonally multiplexed for a plurality of layers is demodulated through cancellation of interference between the layers and in which the data is transmitted from a terminal to a base station through a predetermined uplink resource, is available.

In addition, according to the present disclosure, there is provided a program causing a computer to perform: radio communication; and control such that control information is transmitted to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

In addition, according to the present disclosure, there is provided a program causing a computer to perform: radio communication; and acquisition of control information from a base station via the radio communication, the control information indicating that a communication scheme in which data non-orthogonally multiplexed for a plurality of layers is demodulated through cancellation of interference between the layers and in which the data is transmitted from a terminal to the base station through a predetermined uplink resource, is available.

Advantageous Effects of Invention

According to the present disclosure described above, a device, a method, and a program which enable low latency uplink to be used in a more preferable mode can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram for describing examples of codebooks.

FIG. 7 is an explanatory diagram illustrating an example of a schematic configuration of a system according to one embodiment of the present disclosure.

FIG. 8 is a block diagram illustrating an example of a configuration of a base station according to the embodiment.

FIG. 9 is a block diagram illustrating an example of a configuration of a terminal device according to the embodiment.

FIG. 10 is an example of information reported from the base station to the terminal device as system information.

FIG. 11 is an example of information reported from the terminal device to the base station as an indication.

FIG. 12 is an example of information reported from the base station to the terminal device in response to the indication from the terminal device.

FIG. 18 is a sequence diagram illustrating an example of a schematic flow of a process according to the embodiment.

FIG. 19 is a sequence diagram illustrating an example of a schematic flow of a process according to a modified example of the embodiment.

MODE(S) FOR CARRYING OUT THE INVENTION

Figure 1:
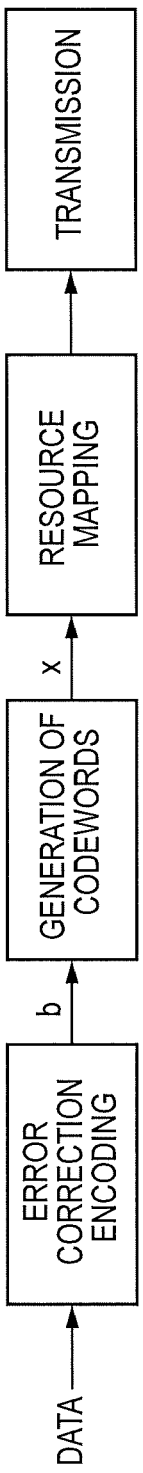
FIG. 1 is an explanatory diagram for describing an example of a schematic process of SCMA.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Introduction
1.1. SCMA
1.2. Review of low latency communication
1.3. Technical problem
2. Schematic configuration of system
3. Configuration of each device
3.1. Configuration of base station
3.2. Configuration of terminal device
4. Technical features
5. Process flow
6. Application examples
7. Conclusion

1. INTRODUCTION

As an introduction, SCMA, an example of CQI and reference signals, and technical problems will be described with reference to FIGS. 1 to 8.
<1.1. SCMA>

First, SCMA will be described with reference to FIGS. 1 to 4.
(1) Schematic Process Flow FIG. 1 is an explanatory diagram for describing an example of a schematic process of SCMA.

In SCMA, for example, error correction encoding is performed and a codeword x is generated from data (binary data) b that has undergone the error correction encoding on the basis of a codebook. Specifically, the codebook is, for example, information indicating correspondences between data candidates and codewords, and data b is converted into a codeword x corresponding to the data b in the codebook one to one. Note that codebooks for each layer are prepared for the purpose of layer separation.

Further, each signal element included in the generated codewords is mapped to a corresponding radio resource. For example, codewords of a plurality of layers are multiplexed first, and then each signal element included in the multiplexed codewords is mapped to a corresponding radio resource. Alternatively, for each of a plurality of layers, each signal element included in the codewords of the layers may be mapped to a corresponding radio resource, and then two or more signal elements mapped to the same radio resource (i.e., signal elements of different layers) may be multiplexed.

Then, the signal elements mapped to the radio resource are transmitted.

Figure 2:
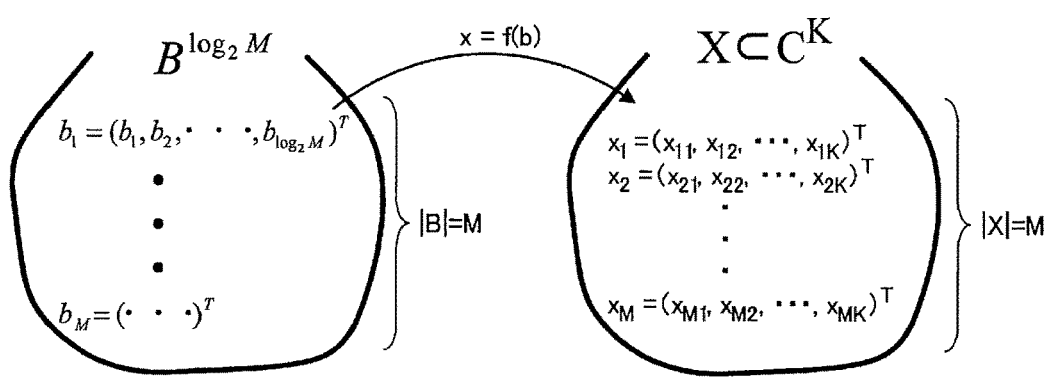
FIG. 2 is an explanatory diagram for describing an example of generation of codewords based on codebooks.

As described above, codewords of a plurality of layers are transmitted on the same radio resource. That is, the radio resource is shared by the plurality of layers. For this reason, SCMA is a non-orthogonal access scheme, not an orthogonal access scheme like OFDMA.
(2) Generation of Codeword FIG. 2 is an explanatory diagram for describing an example of generation of codewords based on codebooks. Referring to FIG. 2, data candidates $b_i$ and codewords $x_j$ are shown. Sizes of the codebooks, i.e., the number of data candidates $b_i$ and the number of codewords $x_j$, are both M. In this case, data that is input information is, for example, a vector including bits as elements and has a length of $\log_2 M$. In addition, a codeword that is output information is a vector including a complex number as a signal element and has the same length as the number of radio resources K to be used in transmission of codewords. Thus, a codebook can also be said to be a function in which input information and output information are both vectors. The codewords that are output information are required to satisfy a desired condition suitable for layer multiplexing.
(3) Example of Codebooks FIG. 3 is an explanatory diagram for describing examples of codebooks. Referring to FIG. 3, codebooks 1 to 6 are shown. The codebooks 1 to 6 are codebooks for Layer 1 to Layer 6. As such, codebooks for each layer are prepared in SCMA. In this example, data that is input information is 2-bit data, and the number of data candidates is 4. Thus, the number of codewords in each codebook is also 4. 2 of 4 signal elements (i.e., complex numbers) are 0 in a codeword of each codebook, and 2 different codewords are sparse. In addition, the other 2 of the 4 signal elements (in other words, a four-dimensional constellation) in the codeword of each codebook are not 0. That is, the number of signal elements N that are not 0 among the 4 signal elements is 2.

(4) Example of Resource Mapping

Figure 4:
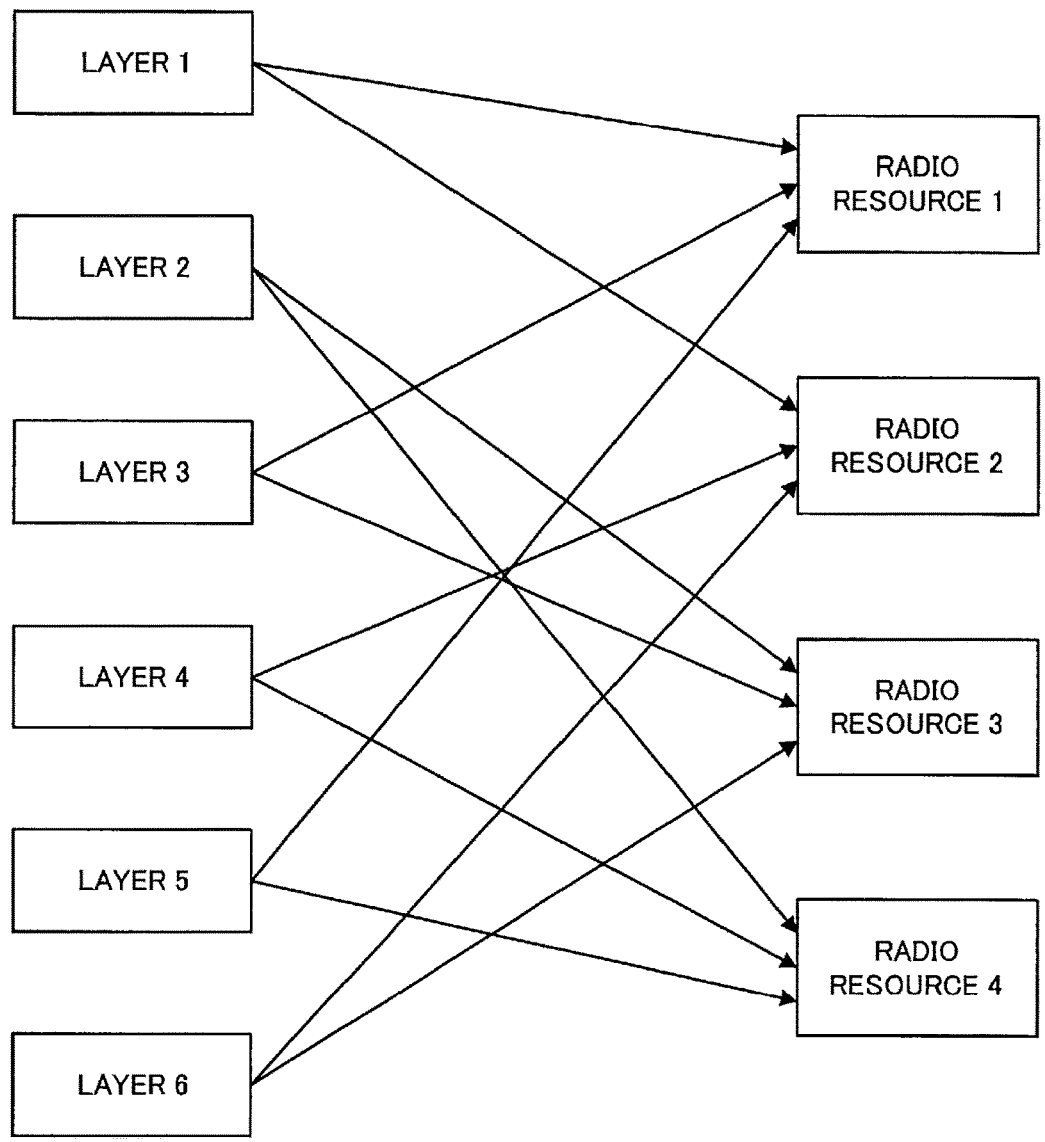
FIG. 4 is an explanatory diagram for describing an example of resource mapping of codebooks.

FIG. 4 is an explanatory diagram for describing an example of resource mapping of codebooks. Referring to FIG. 4, 6 layers and 4 radio resources are shown. In this example, the number of signal elements in a codeword of each layer is 4, and thus 4 radio resources are prepared. For example, signal elements that are not 0 (i.e., 2 signal elements) among 4 signal elements included in the codeword of each layer are mapped to a corresponding radio resource. In other words, in the example illustrated in FIG. 4, signals of a four-dimensional constellation are split into two two-dimensional constellations and mapped. Specifically, for example, a first signal element in a codeword of Layer 1 is mapped to radio resource 1, and a second signal element in the codeword of Layer 1 is mapped to radio resource 2. Further, as another example, a first signal element in a codeword of Layer 3 is mapped to radio resource 1, and a third signal element in the codeword of Layer 3 is mapped to radio resource 3.

In this example, an allowable number of layers J is equal to 2 combinations among the 4 radio resources ($_4C_2$=6). When 6 layers are mapped to 4 radio resources as above, realized overhead is 150%.

(5) Process on Reception Side

In SCMA, a transmission side performs multiplexing of sparse codewords as described above. Meanwhile, a technique called, for example, a message passing algorithm (MPA) using an iterative operation is used on a reception side. According to the message passing technique, a reception device refers to, for example, reception signals of 4 radio resources and estimates an input vector that maximizes a posterior probability of the reception signals.

More generally, for example, codewords of J layers are mapped to K radio resources. In this case, if a codeword of a j-th layer is indicated as $x_j=(x_{1j}, \ldots, x_{Kj})$, a reception signal $y_k$ on a k-th radio resource is expressed as below.

$$y_k = h_k \sum_{j=1}^{J} x_{kj} + n_k \quad \text{[Math. 1]}$$

Here, $h_k$ represents a channel characteristic of the k-th radio resource, and $n_k$ represents a noise component added to the k-th radio resource. In this case, $X^\wedge$ below is an estimated value of an input vector $X=(x_1, x_2, \ldots, x_J)$.

$$\hat{X} = \underset{x}{\mathrm{argmax}}\, p(X \mid y) \quad \text{[Math. 2]}$$

Using the demodulation method described above, the reception side further uses successive interference cancellation (SIC). In SIC, the reception device sequentially cancels reception signals of other layers as interference components in the course of demodulating reception signals of a certain layer. Through such a process, reception signals of the layers are separated and a reception signal of a desired layer is obtained.

Note that, each terminal that performs communication using SCMA holds not only a codebook of its own layer but also a codebook of another layer simultaneously multiplexed in order to cancel another multiplexed signal serving as an interfering wave when data that is multiplexed in SCMA is demodulated.

In the above-described SCMA, a group of a series of codebooks used to multiplex signal elements of codewords generated for a series of layers will be referred to as a codebook group here for the sake of convenience. Note that a combination of codebooks included in a codebook group serves as a combination that is likely to provide constellations of more preferable SCMA signals that ensure a maximum minimum inter-code distance and a minimum level of signal power.

<1.2. Review of Low Latency Communication>

Realization of communication in which latency is further reduced (i.e., low latency communication) has been discussed as a task of $5^{th}$ (5G) generation cellular communication. As a specific example, quick response has been demanded in games and technologies for avoiding traffic accidents, and in order to realize such demands, for example, realization of radio access with low latency has been desired in the field of radio communication.

Here, an uplink operation in past radio communication such as cellular communication will be focused on. In the past radio communication such as cellular communication, radio resources in uplink are managed by base stations to prevent collision of signals of users (i.e., terminal devices) from occurring. Thus, at the time of data transmission from a terminal device (i.e., data transmission in uplink), the terminal device can transmit data in uplink after, for example, reporting a state of data to be transmitted to a base station within a buffer, making a request for allocation of radio resources in uplink, and the like.

As a more specific example, in LTE, a terminal device transmits a buffer status report (BSR) to a base station when new data to be transmitted is generated so that the base station is reported with a status of a transmission buffer of the terminal device. A BSR can express a status of a transmission buffer by breaking down the data size into 64 levels from 0 bytes to 150 kilobytes or more using 6-bit data.

Figure 5:
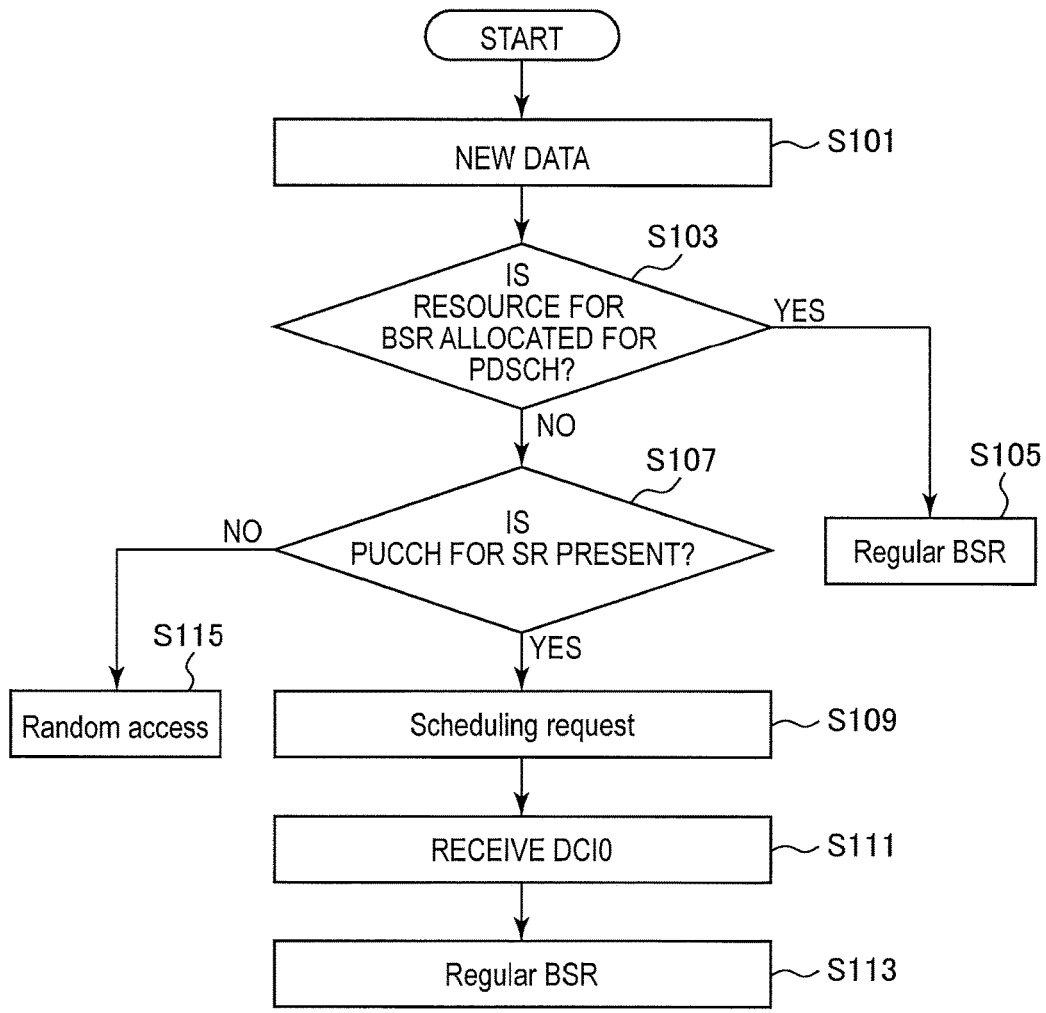
FIG. 5 is an explanatory diagram for describing an example of a flow of a process performed until a regular BSR is reported from a terminal device to a base station.

Here, focusing on a regular BSR among BSRs used in LTE, an example of a flow of a process performed until a regular BSR is reported from a terminal device to a base station will be described with reference to FIG. 5. FIG. 5 is an explanatory diagram for describing an example of a flow of a process performed until a regular BSR is reported from a terminal device to a base station.

In a case in which new data is generated (S101), and radio resources for transmitting a BSR are allocated for a PDSCH (YES in S103), the terminal device transmits a regular BSR using the radio resources (S105).

On the other hand, in a case in which no radio resources for transmitting a BSR are allocated for a PDSCH (NO in S103), the terminal device secures uplink resources and then transmits a regular BSR. Specifically, in a case in which a physical uplink control channel (PUCCH) for a scheduling request (SR) is allocated (YES in S107), the terminal device secures the uplink radio resources by making a scheduling request to the base station (S109). Note that the radio resources allocated to the terminal device are reported from the base station to the terminal device using downlink control information (DCI) 0 transmitted on a physical downlink control channel (PDCCH) (S111). Then, the terminal device transmits the regular BSR using the secured uplink radio resources (S113).

Note that, in a case in which no radio resources for a scheduling request are set for the PUCCH (NO in S107), the terminal device starts a procedure for setting individual channels in random access.

Figure 6:
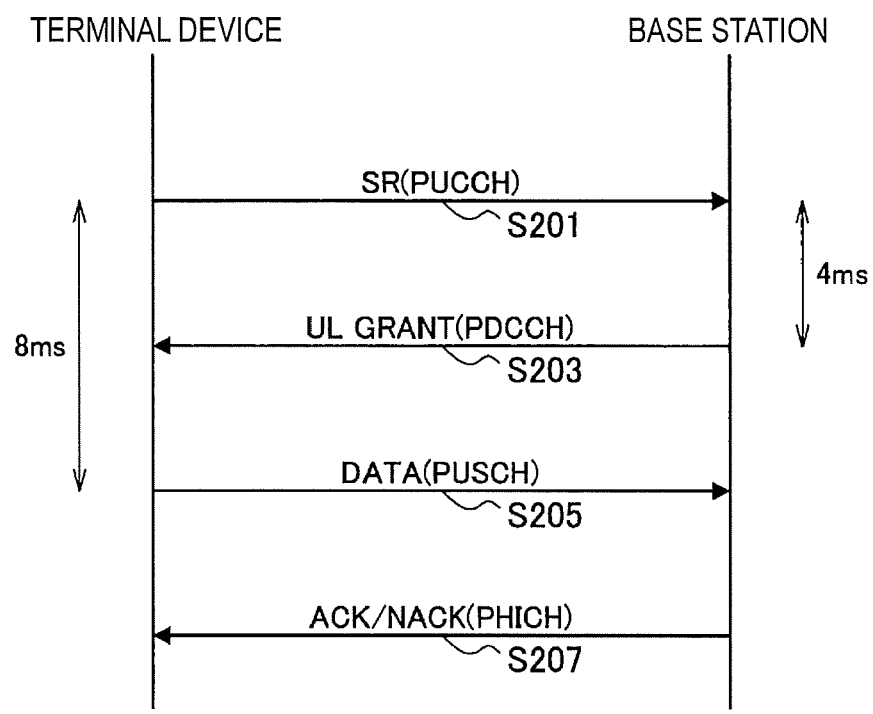
FIG. 6 is a sequence diagram illustrating an example of a communication sequence based on a scheduling request.

Here, an example of a communication sequence executed between the terminal device and the base station based on the scheduling request made by the terminal device will be described with reference to FIG. 6. FIG. 6 is a sequence diagram illustrating the example of the communication sequence based on the scheduling request.

First, the terminal device transmits 1-bit data as a scheduling request (SR) to the base station using a PUCCH (S201). The terminal device can receive a grant of radio resources for uplink (i.e., UL GRANT) from the base station 4 subframes (i.e., 4 ms) after the transmission of the scheduling request at the earliest. Note that, at this time, the uplink grant is reported to the terminal device from the base station using the DCI0 transmitted on a PDCCH (S203).

Then, the terminal device can transmit data to the base station 8 subframes (i.e., 8 ms) after the transmission of the scheduling request at the earliest (S205). After the terminal device transmits the data to the base station, the base station reports an ACK or an NACK to the terminal device depending on whether the base station has received the data with no problem (S207).

Note that it is a matter of course that, in a case in which the base station reserves the scheduling request transmitted from the terminal device (i.e., in a case in which no uplink radio resources are scheduled immediately), a time of 8 subframes or longer is necessary as a period from the transmission of the scheduling request by the terminal device to the transmission of data to the base station.

In addition, radio resources for transmitting scheduling requests by the terminal device to the base station are periodically provided for the PUCCH. Note that, although an interval in which radio resources for transmitting scheduling requests are provided for the PUCCH is variable, the interval is 5 ms at the minimum in LTE.

That is, according to the procedures introduced in FIG. 5 and FIG. 6, there may be a case in which the terminal device transmits a scheduling request to the base station after the new data is generated, and then a time of 13 ms or longer is necessary to transmit a regular BSR to the base station. Thus, it is difficult for the terminal device to realize low latency uplink data transmission in which new data is transmitted to the base station device within 5 ms after the new data is generated according to the procedures.

To deal with a demand for realization of low latency communication as described above, US Patent Application Publication No. 2014/0254544 has disclosed an example of a technology for realizing low latency access in uplink (which may be simply referred to as "low latency uplink" below).

According to the low latency uplink disclosed in the document, a terminal device can transmit a packet called a contention transmission unit (CTU) in uplink without allocation of radio resources through an uplink grant from a base station, like a scheduling request.

On the other hand, according to the low latency uplink disclosed in the document, collision of CTUs may occur on a base station side. For this reason, the base station demodulates each of the CTUs through interference cancellation when collision of CTUs occurs. It is considered in such a communication scheme that contention-based uplink can be realized with higher efficiency by applying, as a CTU, an SCMA signal for multiplexing a plurality of users (i.e., a plurality of layers) with respect to resources.

That is, since the low latency uplink disclosed in the document realizes non-orthogonal multiplexing of a plurality of users by using SCMA and transmission and reception of signals relating to scheduling requests and uplink grants are omitted, low latency access in uplink can be realized.

<1.3. Technical Problem>

Next, a technical problem according to an embodiment of the present disclosure will be described.

As shown by the review of low latency uplink, provision of a mechanism in which the corresponding low latency uplink is available in a more preferable mode has also been desired.

In particular, in the case of the above-described low latency uplink, i.e., in which communication is performed without transmission and reception of signals relating to a scheduling request and an uplink grant, a case in which it is not desirable for a base station to permit an arbitrary terminal device present within a cell to perform the communication can be assumed.

Specifically, in a multiplexing method like SCMA in which a plurality of users share resources, a case in which an allowable range of the number of terminal devices to be multiplexed is exceeded can be assumed when the number thereof is extremely large.

In addition, since a variety of applications can be executed in respective terminal devices, a case in which the terminal devices use the low latency uplink for various purposes can be assumed.

Therefore, the present disclosure proposes a mechanism in which the above-described low latency uplink can be used in a more preferable mode, and particularly proposes a mechanism in which a base station allows only a specific terminal device to execute the low latency uplink.

2. SCHEMATIC CONFIGURATION OF SYSTEM

Next, a schematic configuration of a system 1 according to an embodiment of the present disclosure will be described with reference to FIG. 7. FIG. 7 is an explanatory diagram illustrating an example of a schematic configuration of the system 1 according to the embodiment of the present disclosure. As illustrated in FIG. 7, the system 1 includes a base station 100 and terminal devices 200. Note that the plurality of terminal devices 200 may be included. In the example illustrated in FIG. 7, for example, the system 1 includes terminal devices 200A to 200F. Note that, unless the terminal devices 200A to 200F are particularly distinguished, the terminal devices may be simply referred to as "the terminal devices 200" in description below.

(1) Base Station 100

The base station 100 is a base station of a mobile communication system (or a cellular system). The base station 100 performs radio communication with terminal devices (e.g., the terminal device 200) positioned within a cell 101. The base station 100, for example, transmits downlink signals to terminal devices and receives uplink signals from terminal devices.

(2) Terminal Devices 200

Each of the terminal devices 200 is a terminal device that can communicate in the mobile communication system (or cellular system). The terminal device 200 performs radio communication with base stations (e.g., the base station 100). The terminal device 200, for example, receives downlink signals from base stations and transmits uplink signals from base stations.

(3) Non-Orthogonal Multiplexing Using Codebook

In an embodiment of the present disclosure, in particular, non-orthogonal multiplexing/non-orthogonal multiple access using a codebook is performed.

The codebook is, for example, a codebook of sparse codes (SCs). The non-orthogonal multiple access using the codebook is SCMA, and the non-orthogonal multiplexing using the codebook is multiplexing in SCMA.

Non-orthogonal multiplexing/non-orthogonal multiple access using codebooks are performed in, for example, uplink. Alternatively, non-orthogonal multiplexing/non-orthogonal multiple access using codebooks may be performed in downlink.

3. CONFIGURATION OF EACH DEVICE

Next, examples of configurations of the base station 100 and the terminal device 200 according to the embodiment of the present disclosure will be described with reference to FIGS. 8 and 9.

<3.1. Configuration of Base Station>

First, an example of a configuration of the base station 100 according to the embodiment of the present disclosure will be described with reference to FIG. 8. FIG. 8 is a block diagram illustrating the example of the configuration of the base station 100 according to the embodiment of the present disclosure. As illustrated in FIG. 8, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. For example, the processing unit 150 includes an allocation unit 151, a determination unit 153, an information acquisition unit 155, a reporting unit 157, and a communication processing unit 159. Note that the processing unit 150 can further include other constituent elements than the constituent elements. That is, the processing unit 150 can perform operations other than operations of the constituent elements.

The allocation unit 151, the determination unit 153, the information acquisition unit 155, the reporting unit 157, and the communication processing unit 159 will be described below in detail.

<3.2. Configuration of Terminal Device>

Next, an example of a configuration of the terminal device 200 according to the embodiment of the present disclosure will be described with reference to FIG. 9. FIG. 9 is a block diagram illustrating the example of the configuration of the terminal device 200 according to the embodiment of the present disclosure. As illustrated in FIG. 9, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. For example, the processing unit 240 includes an information acquisition unit 241 and a communication processing unit 243. Note that the processing unit 240 may further include a structural element other than these structural elements. That is, the processing unit 240 may perform operation other than the operation of these structural elements.

The information acquisition unit 241 and the communication processing unit 243 will be described below in detail.

4. TECHNICAL FEATURES

Next, technical features according to the embodiment of the present disclosure will be described with reference to FIGS. 10 to 17.

(1) Indication of Low Latency Uplink

The base station 100 (the reporting unit 157) reports that low latency uplink is available to the terminal device 200 by, for example, transmitting system information to the terminal device 200 present within the cell 101.

The terminal device 200 (the information acquisition unit 241) acquires, for example, the system information from the base station 100. Accordingly, the terminal device 200 recognizes that low latency uplink is available within the cell 101 on the basis of the system information acquired from the base station 100.

Next, the terminal device 200 (the communication processing unit 243) transmits an indication (a low latency indication) for using low latency uplink to the base station 100 in a case in which the terminal device uses low latency uplink. Note that the indication for using low latency uplink (low latency indication) may be referred to as a "low latency UL indication" in description below.

The base station 100 (the determination unit 153) determines whether the terminal device 200 is to be permitted to use low latency uplink after the low latency UL indication is received from the terminal device 200 present within the cell 101. At this time, the base station 100 (the determination unit 153) may determine whether the terminal device 200 is to be permitted to use low latency uplink with reference to the low latency UL indication received from the terminal device 200.

Next, in a case in which the terminal device 200 is permitted to use low latency uplink, the base station 100 (the reporting unit 157) reports a response corresponding to the low latency UL indication. Then, the terminal device 200 can transmit data to the base station 100 in low latency uplink.

(a) Transmission of System Information

The base station 100 (the reporting unit 157) may report, for example, information regarding a condition for using low latency uplink as the system information to the terminal device 200. As a specific example, FIG. 10 shows an example of information reported from the base station 100 to the terminal device 200 as system information.

(a-1) Radio Resources for Low Latency Uplink

In a case in which the base station 100 (the reporting unit 157) secures radio resources to be used in low latency uplink in advance, for example, the base station may include information regarding the radio resources in system information. As specific examples, information of a cycle of radio resources for executing low latency uplink, a frame offset value from a reference frame, a subframe number, and the like is exemplified. In addition, frequency information of radio resources may include a resource block number, a subcarrier number, bitmap information indicating the radio resources, and the like.

(a-2) Timer Value

Further, the base station 100 (the reporting unit 157) may include information regarding a period in which using low latency uplink is permitted (e.g., a timer value) in the system information in a case in which a time of low latency uplink is managed. As specific examples, information such as duration of low latency uplink, and a start time and an end time of low latency uplink is exemplified.

(a-3) Restriction Information

Furthermore, the base station 100 (the determination unit 153) may permit only some terminal devices 200 satisfying a specific condition to use low latency uplink. In this case, the base station 100 (the reporting unit 157) may include information indicating the condition for using low latency uplink (i.e., restriction information) in the system information.

In LTE, for example, a QoS class identifier (QCI) and allocation and retention priority (ARP) are given to each of bearers set for the terminal devices 200. QCIs define characteristics of bearers, each of which has an integer value from 1 to 9. With this configuration, a more preferable bearer can be applied to various applications in LTE.

As a specific example, if QCI=1, a resource type of a bearer is a guaranteed bit rate (GBR), a packet delay budget is 100 ms, and a packet error loss rate is 1%. This setting is assumed for use of voice communication. In addition, as another example, if QCI=9, a resource type is non-GBR, a packet delay budget is 300 ms, and a packet error loss rate is 0.0001%. This setting is assumed for use of data communication.

As described above, the QCIs define characteristics of various bearers in terms of parameters such as a resource type (GBR/non-GBR), priority, a delay amount, and a packet error loss rate.

Meanwhile, ARP indicates priority in setting of bearers. For example, the base station 100 sorts out existing and new bearers on the basis of values of ARP in a case in which the terminal device 200 makes a request for setting a bearer when a network is congested, or makes a request for setting a bearer in a specific situation, such as at an urgent time. ARP has an integer value from 1 to 15, and 1 indicates the highest priority. High priority (i.e., a small value of ARP) is assumed to be set for, for example, urgent voice communication.

In order to limit a terminal device 200 that is subject to low latency uplink (i.e., a terminal device 200 which is permitted to use low latency uplink) under such a condition, the base station 100 may include the restriction information regarding a QoS parameter of a subject QCI or ARP (or information for referring to the restriction information) in the system information.

In addition, in LTE, access classes of the terminal device 200 are stored in a universal subscriber identity module (USIM) mounted in the terminal device 200 in advance. An access class has an integer value from 0 to 15. Note that access classes 0 to 9 are normal classes, and access classes 11 to 15 are prioritized classes.

In order to limit a terminal device 200 that is subject to low latency uplink under such a condition, the base station 100 may include restriction information regarding an access class of a subject terminal device 200 (or information for referring to the restriction information) in the system information.

In addition, in LTE, the terminal device 200 transmits a connection reason (establishment cause) to the base station 100 using an RRC connection request message when making a connection request thereto. The establishment cause includes urgency, high priority access, delay-allowed access, and the like.

Thus, the base station 100 may report the system information to indicate an establishment cause for which the terminal device 200 may be permitted to use low latency uplink.

Further, in LTE, independent access control over voice and video communication of an IP multimedia subsystem (IMS) can be set through service specific access control (SSAC). Thus, restriction with regard to low latency uplink can be associated with access control in such a service of an application layer.

For example, the base station 100 may decide on execution of low latency uplink on the basis of presence or absence of ssac-BarringForMMTEL-Voice-r9, and ssac-BarringForMMTEL-Video-r9 in a system information block (SIB) 2. As described above, the base station 100 may report the restriction information (or information for referring to the restriction information) to the terminal device 200 in advance using the system information.

In addition, in LTE, access control by an access class can be set to be skipped by setting ac-Barring SkipForMMTEL-Voice-r12, ac-BarringSkipForMMTELVideo-r12, and ac-BarringSkipForSMS-r12 as access control.

Thus, in a case in which the above-described parameter is set, the base station 100 may report the parameter to the terminal device 200 using the system information so that the terminal device 200 can determine whether to use low latency uplink with reference to the parameter.

As described above, the base station 100 can restrict the terminal device 200 to use low latency uplink in accordance with a category or a type of a specific application, or presence or absence of access restriction set in the system information. When the base station 100 reports a condition for a subject terminal device 200 with respect to low latency uplink to each of the terminal devices 200 present within the cell 101, for example, the terminal devices 200 that report low latency UL indications to the base station 100 are restricted. In other words, a load imposed on a network caused by the low latency UL indication can be reduced.

Note that a subject application and service are not necessarily limited to the above-described examples, and an application, a service, and a function similar to the above examples may be applied. In addition, the base station 100 may include identification information for identifying the application, the service, and the function to be permitted or restricted with respect to low latency uplink in the system information to be reported to the terminal device 200.

As described above, the base station 100 may include information regarding a condition of a terminal device 200 that is subject to low latency uplink in the system information and thereby report the condition to the terminal device 200. Accordingly, the terminal device 200 can determine whether the device itself can be a subject of low latency uplink.

Note that the above-described examples of information that can be included in the system information (e.g., the examples shown in FIG. 10) are merely examples, and the type and content of the information is not particularly limited as long as it is information regarding the condition of the terminal device 200 that is a subject of low latency uplink. In addition, it is a matter of course that the system information may not necessarily include the information regarding the condition of the terminal device 200 that is a subject of low latency uplink.

In addition, the example in which the base station 100 reports a condition for using low latency uplink to the terminal device 200 by including the information regarding the condition shown in FIG. 10 in the system information has been described. Meanwhile, as long as the base station 100 can report the information regarding the condition for using low latency uplink to the terminal device 200, a method of reporting is not necessarily limited to the method using system information. As a specific example, the base station 100 may report the information regarding the condition for using low latency uplink to the terminal device 200 on the basis of individual signaling thereto.

(b) Indication from Terminal Device

The terminal device 200 (the communication processing unit 243) transmits a low latency UL indication (in other words, makes a request for use of low latency uplink) to the base station 100 in order to use low latency uplink in a case in which use of low latency uplink is desired.

As a specific example, in a case in which an application under execution requests use of low latency uplink, the terminal device 200 (the communication processing unit 243) may transmit the low latency UL indication to the base station 100. In addition, in a case in which a user requests use of low latency uplink through an operation as another example, the terminal device 200 (the communication processing unit 243) may transmit the low latency UL indication to the base station 100. As described above, the terminal device 200 (the communication processing unit 243) may transmit the low latency UL indication to the base station 100 at, for example, a trigger of a predetermined operation.

Note that, although the request made by the terminal device 200 with respect to the base station 100 for using low latency uplink is referred to as a low latency UL indication (low latency indication) in the above description, it is not necessarily limited to that term. It is a matter of course that any term may be used as long as the term conveys a similar intention to the above term, and "low latency interest indication," "low latency request," and the like are specific examples.

In addition, the terminal device 200 (the communication processing unit 243) may report information regarding a condition for transmitting data using low latency uplink to the base station 100 as the low latency UL indication. As specific examples, FIG. 11 shows examples of information reported from the terminal device 200 to the base station 100 as indications.

(b-1) Latency Level

The terminal device 200 (the communication processing unit 243) may include, for example, information indicating a latency level in accordance with a use purpose of low latency uplink in the low latency UL indication.

As a specific example, the terminal device 200 (the communication processing unit 243) may include information indicating a latency level in the low latency UL indication in accordance with the latency level required by an application that makes a request for use of low latency uplink.

Accordingly, the base station 100 can perform scheduling with respect to radio resources for uplink (i.e., low latency uplink) between the terminal device 200 that has been reported with the information indicating the latency level and another terminal device 200 in a more preferable mode.

Note that a form of the information indicating the latency level is not particularly limited as long as the terminal device 200 can report the latency level to the base station 100. As a specific example, an integer value from 1 to N may be allocated to the information in accordance with the required latency level. In this case, for example, 1 indicates the lowest latency level and a delay amount thereof is set to be about 1 ms or so with respect to latency levels, and a greater delay amount may be set when a latency level has a higher value.

(b-2) Importance

In addition, the terminal device 200 (the communication processing unit 243) may include information indicating importance of low latency uplink in accordance with its use purpose in the low latency UL indication.

Accordingly, the base station 100 can comprehensively determine whether each of the terminal devices 200 that reported the information indicating importance is to be permitted to use low latency uplink in accordance with a status of the terminal device 200 present within the cell 101. In addition, at this time, the base station 100 can also permit the terminal device 200 that reported the information indicating the importance to use low latency uplink in a more preferable setting (e.g., with a timer value, a latency level, importance, or the like) in accordance with a status of the terminal device 200 present within the cell 101.

Note that a form of the information indicating importance is not particularly limited as long as the terminal device 200 can report the importance to the base station 100. As a specific example, an integer value from 1 to N may be allocated to importance in accordance with the degree. In this case, for example, a value 1 may be associated with the highest importance and values higher than 1 may be associated with lower importance in an ascending order of the values. Note that as examples of assumable importance, for example, "urgent," "normal," "delay allowed," and the like are exemplified.

(b-3) Identifier

In addition, the terminal device 200 (the communication processing unit 243) may include an identifier in the low latency UL indication in accordance with a use purpose (or a use application) of low latency uplink.

As a specific example, the terminal device 200 (the communication processing unit 243) may include an identifier of a bearer such as a bearer ID associated with an application in the low latency UL indication.

In addition, as another example, the terminal device 200 (the communication processing unit 243) may include an identifier indicating an attribute of an application (e.g., an application requesting use of low latency uplink) in the low latency UL indication.

As described above, the terminal device 200 (the communication processing unit 243) may report, for example, a service, an application, and communication quality for which the terminal device tries to use low latency uplink to the base station 100.

Accordingly, the base station 100 can comprehensively determine whether the terminal device 200 that reported the identifier is to be permitted to use low latency uplink in accordance with a status of each of the terminal devices 200 present within the cell 101. In addition, at this time, the base station 100 can permit the terminal device 200 that reported the identifier to use low latency uplink in a more preferably setting (e.g., with a timer value, a latency level, importance, or the like) in accordance with a status of each of the terminal devices 200 present within the cell 101.

Note that a form of information indicating the identifier is not particularly limited as long as the terminal device 200 can report the identifier in accordance with a use purpose (or a use application) of low latency uplink to the base station 100. As a specific example, a value of the above-described CQI, ARP, or the like may be used as the identifier.

(b-4) Codebook Candidates

As described above, low latency uplink is assumed to be realized using SCMA. Thus, the terminal device 200 (the communication processing unit 243) may include, for example, information indicating candidates for a codebook (or a codebook group) to be used in low latency uplink (e.g., IDs or indexes indicating the candidates) in the low latency UL indication.

As a specific example, the terminal device 200 may estimate a more preferable codebook or codebook group on the basis of a signal (e.g., a reference signal) transmitted from the base station 100 and include information regarding the estimation result in the low latency UL indication.

The above-described information indicating candidates for a codebook (or a codebook group) can be used as reference information for determining a codebook (or a codebook group) to be used in low latency uplink when, for example, uplink based on a different communication scheme from SCMA is switched to low latency uplink using SCMA.

In addition, since the base station 100 can select a more preferable codebook (or a codebook group) for low latency uplink, communication efficiency in low latency uplink can be more improved.

As described above, the terminal device 200 may include information regarding a condition for transmitting data in low latency uplink in low latency UL indication and report the condition to the base station 100. Accordingly, the base station 100 can determine whether the terminal device 200 is to be permitted to use low latency uplink under the reported condition. In addition, at this time, the base station 100 can permit the terminal device 200 to use low latency uplink in a more preferable setting under the reported condition.

Note that the above-described examples of the information that can be included in the low latency UL indication (e.g., the examples shown in FIG. 11) are merely examples, and a type or content of the information is not particularly limited as long as the information relates to a condition for transmitting data in low latency uplink. In addition, it is a matter of course that the low latency UL indication may not necessarily include the above-described information regarding a condition for transmitting data in low latency uplink.

In addition, a trigger for the terminal device 200 to transmit the low latency UL indication to the base station 100 is not limited to the above examples. The terminal device 200 (the communication processing unit 243) may transmit the low latency UL indication to the base station 100, for example, at a trigger of detection of updating of the system information by the base station 100.

As a more specific example, in LTE, the terminal device 200 connected to the base station 100 can recognize that the base station 100 has updated the system information through a "value tag" included in SIB1. In addition, as another example, the terminal device 200 in an idle state can recognize that the base station 100 has updated the system information through flag information included in a paging message. Thus, in the case in which the terminal device 200 has recognized the updating of the system information by the base station 100 by using those mechanisms, the terminal device may transmit the low latency UL indication to the base station 100 triggered by the updating.

In addition, the terminal device 200 may temporarily restrain transmission of the low latency UL indication to the base station 100 in a period in which low latency uplink is validated. Specifically, in a case in which validation of low latency uplink permitted on the basis of a low latency UL indication transmitted in advance has not expired, the terminal device 200 may restrain transmission of a new low latency UL indication to the base station 100. Accordingly, more transmission operations of low latency UL indications than necessity can be restrained, and a load on a network caused by the low latency UL indication can be reduced.

(c) Response to Indication

The base station 100 (the reporting unit 157) may report information for using low latency uplink to the terminal device 200, for example, in response to the low latency UL indication in a case in which the terminal device 200 is permitted to use low latency uplink. As a specific example, FIG. 12 is an example of information reported from the base station 100 to the terminal device 200 in response to the low latency UL indication.

(c-1) Timer Value

The base station 100 (the determination unit 153) may give limitative permit to the terminal device 200 to use low latency uplink by, for example, setting a period in which the terminal device 200 is permitted to use low latency uplink. In addition, the base station 100 (the determination unit 153) may determine the period in which the terminal device 200 is permitted to use low latency uplink on the basis of the information included in the low latency UL indication (i.e., the information regarding a condition for transmitting data in low latency uplink).

In such a case, for example, the base station 100 (the reporting unit 157) may include information (e.g., a timer value) indicating the period in which the terminal device 200 is permitted to use low latency uplink (i.e., the period in which low latency uplink is validated) in the response to the low latency UL indication.

As a specific example, the base station 100 (the reporting unit 157) may include information indicating a low latency uplink valid period (i.e., a timer expiration point) in the response to the low latency UL indication.

In this case, for example, the terminal device 200 (the communication processing unit 243) measures the period in which the terminal device is permitted to use low latency uplink on the basis of the timer value reported by the base station 100, and transmits data to the base station 100 using low latency uplink within the limited period. That is, the terminal device 200 can transmit the data to the base station 100 in uplink without a scheduling request (i.e., low latency uplink) within the period.

Note that, as long as the base station 100 (the reporting unit 157) can report the period in which the terminal device 200 is permitted to use low latency uplink, a type or content of the reported information is not particularly limited. As a specific example, the base station 100 (the reporting unit 157) may report the period in which the terminal device 200 is permitted to use low latency uplink using a value in units of frames or subframes that indicates a time range determined in advance.

(e-2) Latency Level and Importance

In addition, for example, the base station 100 (the determination unit 153) may set a latency level or importance with respect to the low latency uplink in a case in which the terminal device 200 is permitted to use low latency uplink. Note that, at this time, the base station 100 (the determination unit 153) may set the latency level or importance with respect to the low latency uplink with reference to information of the latency level or importance reported by the terminal device 200 as the low latency UL indication.

In this case, the base station 100 (the reporting unit 157) may include information indicating a value set for the latency level or importance with respect to the low latency uplink that the terminal device 200 is permitted to use in the response to the low latency UL indication.

Accordingly, the terminal device 200 can control, for example, an operation of a service or an application that uses the low latency uplink in accordance with the value set for the latency level or importance reported by the base station 100.

Note that a case in which the base station 100 (the determination unit 153) sets a latency level or importance with respect to low latency uplink that a terminal device 200 that is a transmission source of the low latency UL indication is permitted to use, for example, in accordance with a statue of each of the terminal devices 200 present within the cell 101 is assumed. That is, the latency level or importance reported by the terminal device 200 in the low latency UL indication may not be necessarily reflected in low latency uplink that the terminal device 200 is permitted to use Thus, in a case in which, for example, a value set for the latency level or importance reported to the base station 100 in the low latency UL indication is different from a value set for the latency level or importance reported by the base station 100, the terminal device 200 may execute a predetermined operation relating to a service or an application performed in low latency uplink. As a further specific example, in a case in which the latency level reported by the base station 100 is lower than the latency level reported to the base station 100 (i.e., a delay amount is large), the terminal device 200 may notify a user who uses the service or application of the fact.

As described above, the base station 100 may report information for using low latency uplink (e.g., information indicating a user condition thereof) to the terminal device 200 by including the information in a response to the low latency UL indication. Accordingly, the terminal device 200 can transmit data to the base station 100 in low latency uplink within a range permitted by the base station 100 on the basis of the reported information.

Note that the examples of the above-described information that can be included in the response to the low latency UL indication (e.g., the examples shown in FIG. 12) are merely examples, and a type or content of the information is not particularly limited as long as it is information for using low latency uplink. In addition, it is a matter of course that the response to the low latency UL indication may not necessarily include the above-described information for using low latency uplink.

(d) Transmission of Data from Terminal Device

The terminal device 200 (the communication processing unit 243) can use low latency uplink within a range permitted by the base station 100 after receiving the response to the low latency UL indication from the base station 100.

As a further specific example, when new data to be transmitted is generated, the terminal device 200 (the communication processing unit 243) converts the new data into a codeword based on a codebook set in advance. Then, the terminal device 200 (the communication processing unit 243) maps signal elements included in the generated codeword to radio resources for low latency uplink set in advance. Then, the signal elements mapped to the radio resources are transmitted from the terminal device 200 to the base station 100.

Note that, as long as the terminal device 200 (the communication processing unit 243) can recognize the codebook or the radio resources for low latency uplink until the timing at which the new data is transmitted to the base station 100, a method and a timing of the recognition is not particularly limited.

The base station 100 (the reporting unit 157) may report the codebook or the radio resources to the terminal device 200 by including them in system information. In addition, as another example, the base station 100 (the reporting unit 157) may report the codebook or the radio resources to the terminal device 200 by including them in the response to the low latency UL indication. Further, as still another example, the base station 100 (the reporting unit 157) may report the codebook or the radio resources to the terminal device 200 by using individual signaling that is different from the system information and the response to the low latency UL indication.

Note that the codebook may be dynamically determined by the base station 100. In addition, the radio resources may be dynamically allocated by the base station 100. Note that a case in which the base station 100 dynamically allocates the radio resources will be separately described below.

Further, as long as the codebook can be reported to the terminal device 200 until the timing at which the terminal device 200 (the communication processing unit 243) transmits the new data to the base station 100, a timing at which the base station 100 determines the codebook is not particularly limited. Likewise, as long as the radio resources can be reported to the terminal device 200 at the timing at which the terminal device 200 (the communication processing unit 243) transmits the new data to the base station 100, a timing at which the base station 100 allocates the radio resources is not particularly limited.

In addition, as another example, the codebook or the radio resources for low latency uplink may be set in advance. Note that it is a matter of course that, in the case in which the codebook or the radio resources for low latency uplink may be set in advance, the base station 100 (the reporting unit 157) may not necessarily report the codebook or the radio resources to the terminal device 200.

(2) Allocation
(a) Allocation of Resources

The base station 100 (the allocation unit 151) allocates, for example, radio resources to the terminal device 200. In addition, the base station 100 (the allocation unit 151) may secure radio resources to be used in low latency uplink in advance.

The radio resources are, for example, radio resources to be used in transmission of codewords. More specifically, the radio resources are, for example, blocks corresponding to lengths of codewords. This point will be described below exemplifying the blocks with reference to FIG. 13.

Figure 13:
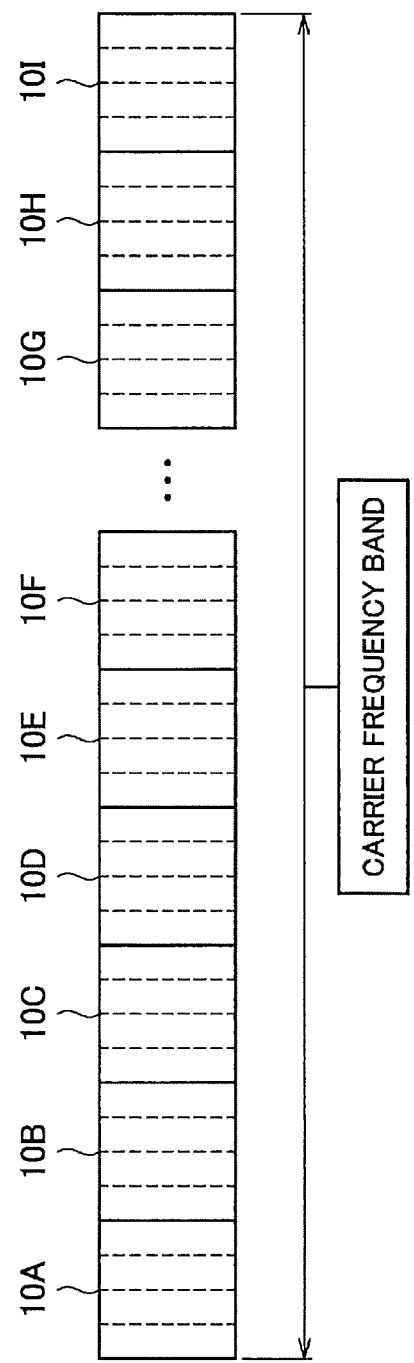
FIG. 13 is an explanatory diagram for describing an example of blocks which are radio resources to be used in transmission of codewords.

FIG. 13 is an explanatory diagram for describing an example of the blocks which are radio resources to be used in transmission of codewords. Referring to FIG. 13, a carrier frequency band is shown. The carrier frequency band includes a plurality of blocks 10 (e.g., blocks 10A to 10I, etc.). A length of a codeword (i.e., the number of signal elements included in a codeword) is, for example, 4, and each block 10 includes 4 subcarriers in the frequency direction. As an example, the subcarriers are deployed at an interval of 12 kHz. The blocks 10 also include predetermined periods in a time direction. The predetermined periods are, for example, symbols, slots, subframes, or radio frames. The blocks 10 may be resource blocks that are units of allocation of radio resources, or may be sub-resource blocks that are a part of the resource blocks. The base station 100 (the allocation unit 151) allocates one or more blocks 10 to the terminal device 200. In addition, the base station 100 (the allocation unit 151) allocates the same block 10 to two or more terminal devices 200. The base station 100 (the allocation unit 151) allocates, for example, the same block 10 to the terminal devices 200A to 200F.

Although the example in which the blocks to be used in transmission of codewords are contiguous in the frequency direction has been described, the blocks are not limited thereto. The blocks may be, for example, non-contiguous in the frequency direction. That is, the blocks may include two or more discrete subcarriers in the frequency direction.

In addition, although the example in which a length of a codeword (and the number of subcarriers included in a block) is 4 has been described, the length (and the number) is not limited thereto. A length of a codeword (and the number of subcarriers included in a block) may be, for example, another length (and another number). The length (and the number) may be, for example, 6 or 12.

(b) Allocation of Layers

The base station 100 (the allocation unit 151) allocates, for example, each of a plurality of layers that are subject to non-orthogonal multiplexing using a codebook to the terminal device 200.

(b-1) Non-Orthogonal Multiplexing Using Codebook

As described above, the codebook is, for example, a codebook of sparse codes (SCs), and the non-orthogonal multiplexing using the codebook is multiplexing in SCMA.

(b-2) Plurality of Layers

The plurality of layers is, for example, layers of SCMA.

The number of layers of the plurality of layers is, for example, equal to or smaller than an acceptable maximum number. As an example, the acceptable maximum number is 6. That is, the base station 100 (the allocation unit 151) allocates each of 6 or fewer layers to the terminal device 200.

The base station 100 (the allocation unit 151) allocates, for example, each of 6 layers (Layer 1 to Layer 6) to the terminal device 200. The base station 100 (the allocation unit 151) allocates, for example, each of 5 layers (5 out of Layer 1 to Layer 6) to the terminal device 200.

Note that, as a length of a codeword (and the number of subcarriers to be used in transmission of a codeword) become greater, the acceptable maximum number increases, which, however, makes design of a codebook more difficult and increases a load of a reception process.

(b-3) Example of Allocation of Layers

The base station 100 (the allocation unit 151) allocates, for example, each of the plurality of layers to different terminal devices 200. As an example, the base station 100 (the allocation unit 151) allocates Layer 1 to the terminal device 200A, Layer 2 to the terminal device 200B, Layer 3 to the terminal device 200C, Layer 4 to the terminal device 200D, Layer 5 to the terminal device 200E, and Layer 6 to the terminal device 200F. Accordingly, for example, more terminal devices 200 can communicate at the same time.

Note that the base station 100 (the allocation unit 151) may allocate 2 or more layers to the same terminal device 200. As an example, the base station 100 (the allocation unit 151) may allocate Layer 1 and Layer 2 to the terminal device 200A. Accordingly, for example, a communication speed of the terminal device 200A can improve.

(3) Reporting of Layer

The base station 100 (the information acquisition unit 155) acquires information indicating a layer to be allocated to the terminal device 200 among the plurality of layers (i.e., a plurality of layers that are subject to non-orthogonal multiplexing using a codebook). Then, the base station 100 (the reporting unit 157) reports the layer to the terminal device 200.

Accordingly, for example, the terminal device 200 can ascertain the layer allocated to the terminal device 200 when non-orthogonal multiplexing using a codebook is used.

(a) Reporting with DCI

The base station 100 (the reporting unit 157) reports, for example, the layer included in downlink control information (DCI) to the terminal device 200. The DCI is, for example, information transmitted on a physical downlink control channel (PDCCH).

The base station 100 (the reporting unit 157) reports, for example, Layer 1 allocated to the terminal device 200A to the terminal device 200A using DCI destined for the terminal device 200A. The base station 100 (the reporting unit 157) reports, for example, Layer 4 allocated to the terminal device 200D to the terminal device 200D using DCI destined for the terminal device 200D.

Accordingly, for example, dynamic allocation of layers (e.g., allocation of layers of each subframe) is possible. Thus, even when non-orthogonal multiplexing using a codebook is used, for example, the terminal device 200 can flexibly perform a DRX operation and/or semi-persistent communication (i.e, communication in which data is intermittently received only in a pre-determined pattern).

(b) Specific Operation

The base station 100 (the reporting unit 157) generates, for example, DCI including information indicating the layer. The information indicating the layer may be a layer number of the layer.

The base station 100 (the communication processing unit 159) generates a CRC on the basis of, for example, an ID of the terminal device 200 (e.g., RNTI: radio network temporary ID), and adds the CRC to the DCI. Then, the base station 100 (the communication processing unit 159) performs encoding, rate matching, and multiplexing on the DCI to which the CRC has been added.

Meanwhile, the terminal device 200 monitors the PDCCH of each subframe on the basis of, for example, the ID (e.g., RNTI) of the terminal device 200 and finds out DCI destined for the terminal device 200. Then, the terminal device 200 (the information acquisition unit 241) acquires the DCI and acquires the information indicating the layer included in the DCI.

(c) Reporting of Other Information

The base station 100 (the reporting unit 157) reports, for example, a radio resource to be used in transmission of a codeword of the layer included in the DCI to the terminal device 200. Accordingly, the terminal device 200 can ascertain the radio resource of the layer allocated to the terminal device 200.

Furthermore, the base station 100 (the reporting unit 157) may report, for example, other information suitable for a transmission mode included in the DCI to the terminal device 200. The other information may include a modulation and coding scheme (MCS), a new data indicator (NDI), a power control command of a physical uplink control channel (PUCCH), and/or precoding information.

(4) Communication Processes

The base station 100 (the communication processing unit 159) performs, for example, a communication process for the plurality of layers (i.e., a plurality of layers that are subject to non-orthogonal multiplexing using a codebook).

The terminal device 200 (the information acquisition unit 241) acquires, for example, information indicating a layer allocated to the terminal device 200 among the plurality of layers. Then, the terminal device 200 (the communication processing unit 243) performs a communication process for the layer on the basis of the information indicating the layer.

(a) Downlink Case

The non-orthogonal multiplexing is performed in, for example, downlink. In this case, the base station 100 (the communication processing unit 159) performs a transmission process for the plurality of layers. Meanwhile, the terminal device 200 (the communication processing unit 243) performs a reception process for the layer allocated to the terminal device 200 among the plurality of layers.

(a-1) Transmission Process of Base Station 100

Generation of Codeword

The transmission process includes, for example, generation of a codeword of a layer from data of the layer for each of the plurality of layers. For example, the base station 100 (the communication processing unit 159) generates a codeword of a layer from data of the layer for each of the plurality of layers on the basis of a codebook for the layer.

The base station 100 (the communication processing unit 159) generates, for example, a codeword of Layer 1 from data of Layer 1 on the basis of a codebook (e.g., Codebook 1 illustrated in FIG. 3) for Layer 1. Further, as another example, the base station 100 (the communication processing unit 159) generates a codeword of Layer 4 from data of Layer 4 on the basis of a codebook (e.g., Codebook 4 illustrated in FIG. 3) for Layer 4.

Note that the codebooks used during generation of codewords may be, for example, codebooks included in a codebook group selected on the basis of a codebook indication from each of the terminal devices 200.

Mapping of Codewords to Radio Resources

The transmission process includes, for example, mapping of the codewords to radio resources to be used in transmission of the codewords for each of the plurality of layers.

The base station 100 (the communication processing unit 159) maps, for example, the codewords to the same block for each of the plurality of layers. More specifically, for example, the base station 100 (the communication processing unit 159) maps each signal element included in the codeword of each layer to a corresponding radio resource (e.g., a resource element) within the block.

At this time, the base station 100 (the communication processing unit 159) performs multiplexing by mapping the codewords of the plurality of layers to the same block. Note that, although signal elements of codewords of different layers are mapped to the same resource element, the signal elements may be mapped to the same resource element after the signal elements are added, or may be added after the signal elements are mapped to the same resource element.

In addition, the base station 100 (the communication processing unit 159) maps various reference signals to a predetermined resource element. Note that a reference signal for frequency synchronization, for example, a CRS, is exemplified as an example of the reference signal.

Example of Overall Transmission Process

First Example

Figure 14:
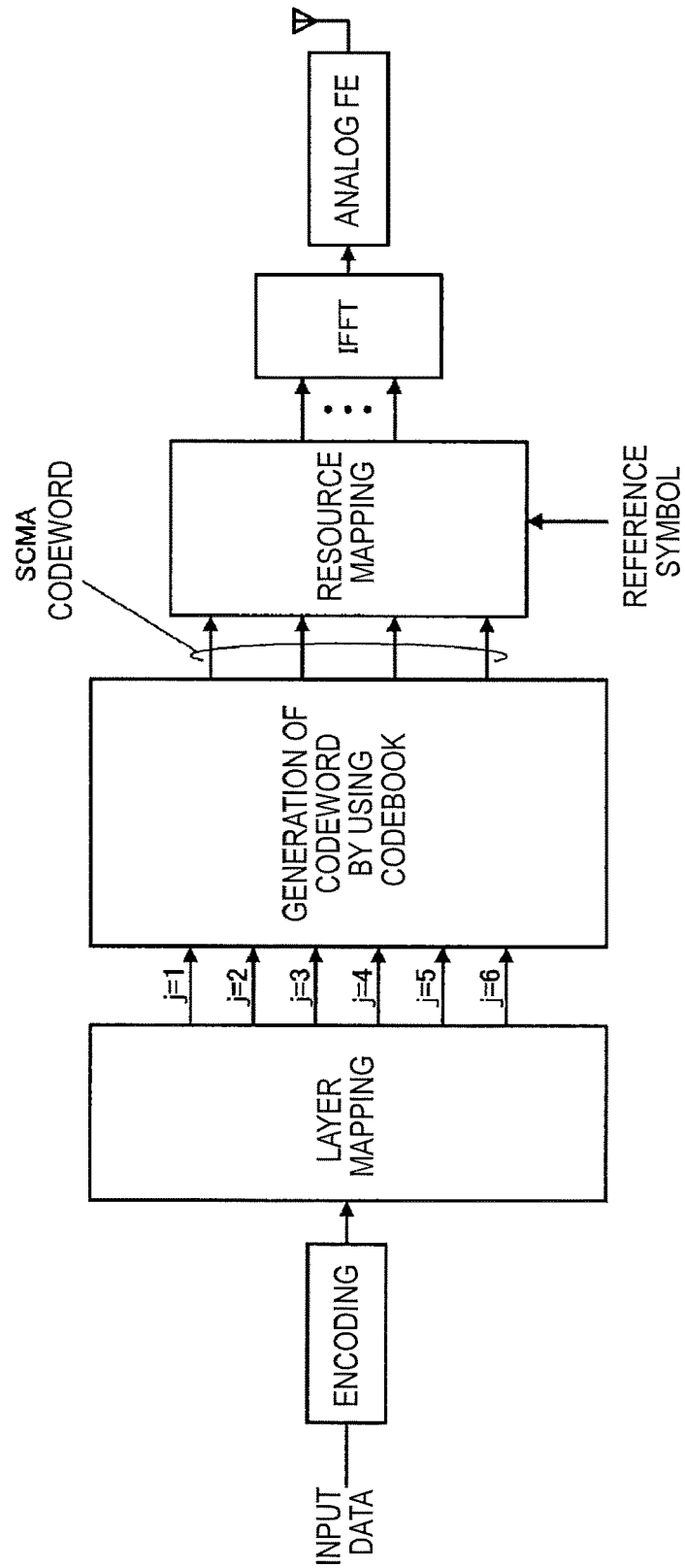
FIG. 14 is an explanatory diagram for describing a first example of an overall transmission process of a base station.

FIG. 14 is an explanatory diagram for describing a first example of an overall transmission process of the base station 100. The transmission process of the base station 100 includes, for example, encoding, layer mapping, generation of codewords based on codewords, resource mapping, an inverse fast Fourier transform (IFFT), and the like.

Figure 15:
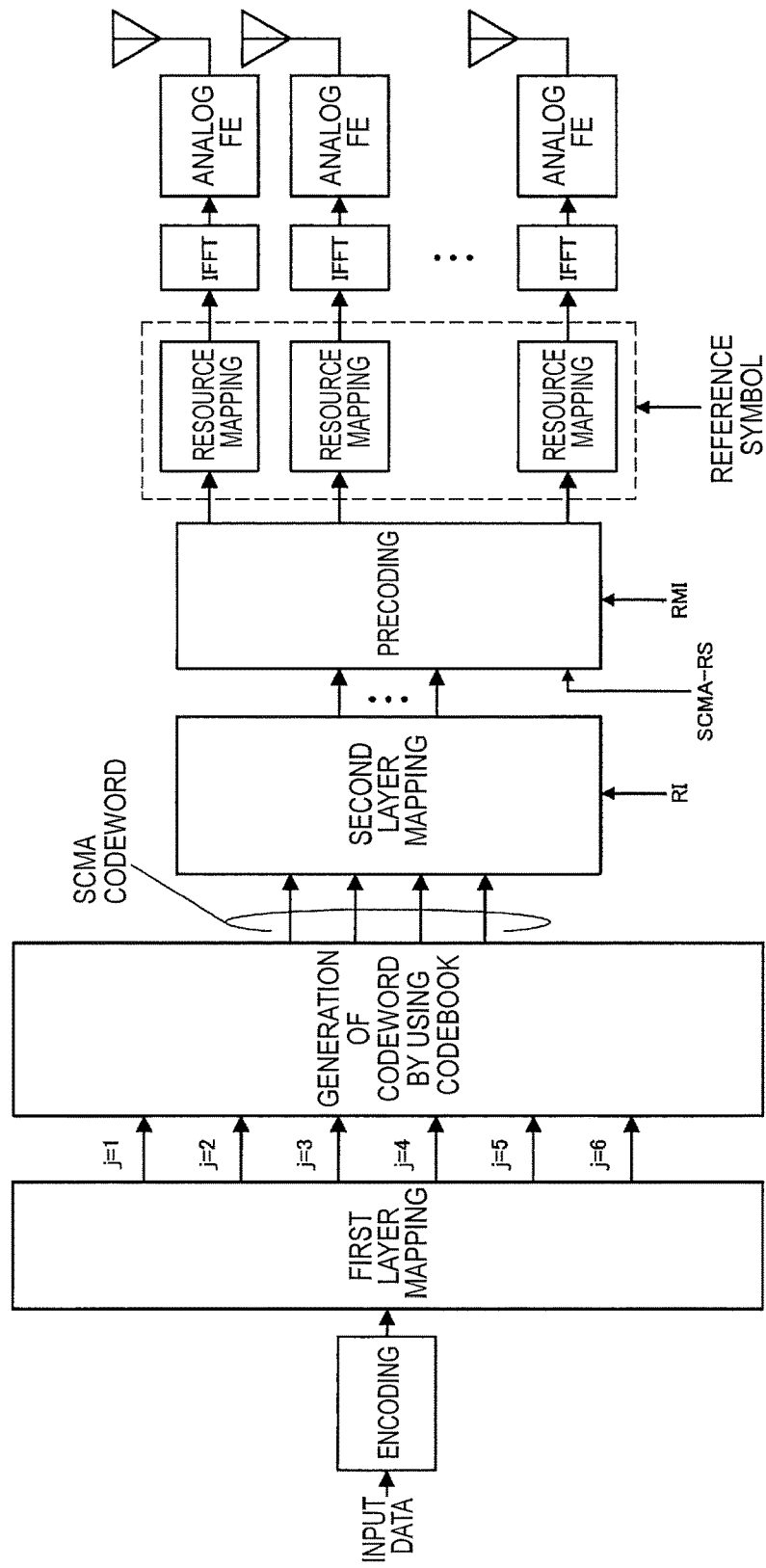
FIG. 15 is an explanatory diagram for describing a second example of an overall transmission process of a base station.

FIG. 15 is an explanatory diagram for describing a second example of an overall transmission process of a base station 100. The second example is a case example of Multiple-Input and Multiple-Output (MIMO). Note that, in present description, a case in which beamforming by a precoder is accompanied with spatial multiplexing will be described as a case example of MIMO.

As illustrated in FIG. 15, the transmission process of the base station 100 in this case includes second layer mapping for spatial multiplexing in addition to first layer mapping for non-orthogonal multiplexing using a codebook. Furthermore, the transmission process includes precoding for spatial multiplexing.

Codewords are, for example, mapped to transmission layers in the second layer mapping, weighted for each antenna in the precoding, and then transmitted. Note that the number of transmission layers is decided on with reference to, for example, a rank indicator (RI) reported by the terminal device 200 to the base station 100. In addition, a set of weights of the precoding is selected among predetermined set groups, for example, such that a total throughput of layers has a maximum value. The set of weights of the precoding is decided on with reference to, for example, a precoding matrix indicator (PMI) reported by the terminal device 200 to the base station 100.

(a-2) Reception Process of Terminal Device 200

Demapping of Reception Signal from Radio Resources

The reception process includes, for example, demapping the reception signal from the radio resources allocated to the terminal device 200.

The terminal device 200 (the communication processing unit 243) demaps, for example, the reception signal in which signal elements of codewords of different layers are multiplexed from the radio resources used during the transmission of the codewords.

In addition, the terminal device 200 (the communication processing unit 243) demaps various reference signals from the radio resources used during the transmission of the reference signals. Accordingly, the reference signal (CRS) for frequency synchronization, and the like, is demapped, for example.

Demodulation of SCMA-Modulated Data

The reception process includes, for example, demodulating data of each SCMA-modulated layer through SIC. For example, the terminal device 200 (the communication processing unit 243) demodulates the data of a layer on the basis of a codebook for the layer.

The terminal device 200 (the communication processing unit 243) separates, for example, data of a desired layer (i.e., signal elements of codewords) among the layers from the reception signal for the radio resources allocated to the terminal device 200 on the basis of the codebook for the layer. Specifically, in a case in which data of Layer 1 is separated from the reception signal, the terminal device 200 (the communication processing unit 243) cancels a signal (interference) of another layer other than Layer 1 through SIC, and thereby separates the data of Layer 1. Note that the terminal device 200 separates the data of Layer 1 through SIC on the basis of the codebook for Layer 1 as well as a codebook for the other layer in order to cancel the signal of the other layer.

The terminal device 200 (the communication processing unit 243) demodulates codewords of a layer from the data separated from the reception signal for the radio resources for each layer (i.e., the signal elements of the codewords). Then, the terminal device 200 (the communication processing unit 243) decodes data of each of the layers from the demodulated codewords of the layer on the basis of the codebook for the layer.

As described above, the terminal device 200 (the communication processing unit 243) decodes the data of the layer allocated to the device.

Example of Overall Reception Process

First Example

Figure 16:
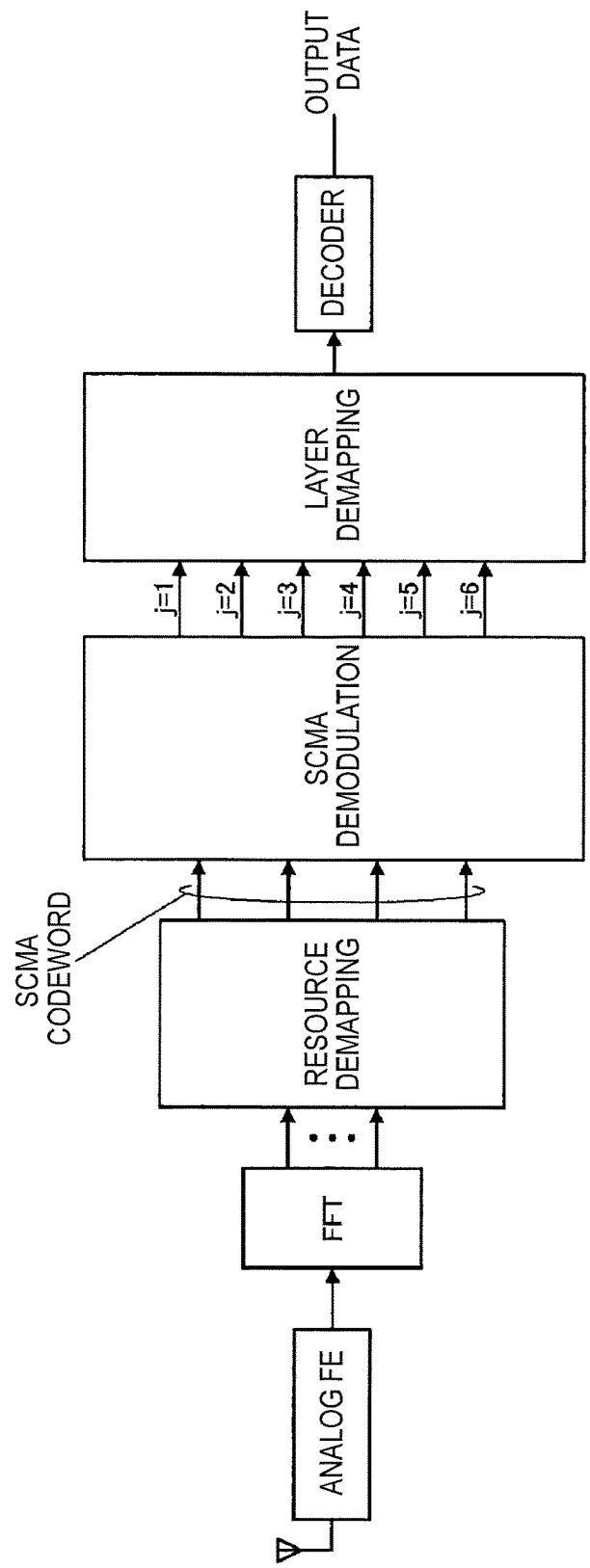
FIG. 16 is an explanatory diagram for describing a first example of an overall reception process of a terminal device.

FIG. 16 is an explanatory diagram for describing a first example of an overall reception process of the terminal device 200. The reception process of the terminal device 200 includes, for example, performing a Fast Fourier Transform (FFT), resource demapping, SCMA demodulating, layer mapping, and decoding.

Second Example

Figure 17:
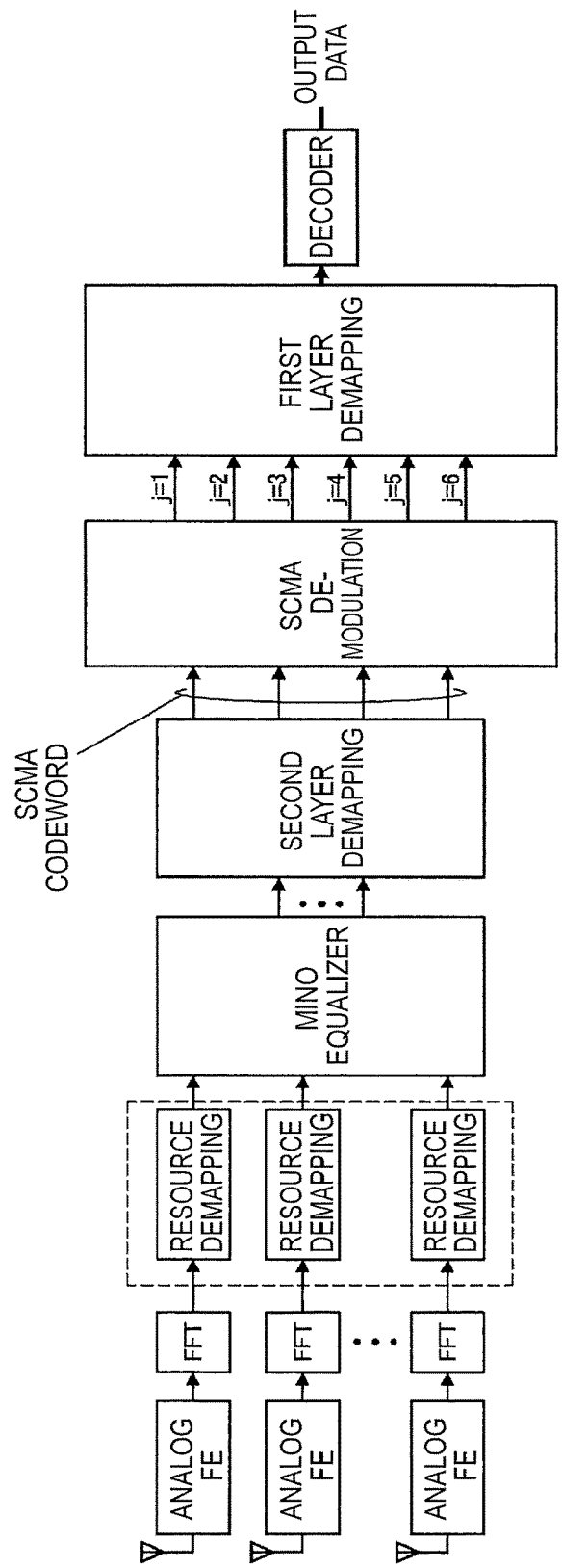
FIG. 17 is an explanatory diagram for describing a second example of an overall reception process of a terminal device.

FIG. 17 is an explanatory diagram for describing a second example of an overall reception process of the terminal device 200. The second example is a case example of MIMO. The reception process of the terminal device 200 includes first layer demapping for taking data of each layer from a decoding result of SCMA-modulated data and second layer demapping for receiving each of spatially multiplexed signals in the example illustrated in FIG. 15.

Specifically, the terminal device 200 (the communication processing unit 243) demaps partially multiplexed signals from radio resources allocated to the terminal device 200 by performing a demapping process on signals received via a plurality of antennas.

In addition, the terminal device 200 (the communication processing unit 243) demaps various reference signals from radio resources used during the transmission of the reference signals by performing the demapping process on the signals received by the each of the antennas. Accordingly, the existing reference signals, for example, the CRS, CSI-RS, DM-RS, and the like, are demapped.

The terminal device 200 (the communication processing unit 243) estimates a spatial channel matrix H on the basis of the demapped reference signals and calculates a reception weight matrix W on the basis of an MMSE algorithm from, for example, the estimated channel matrix H.

The terminal device 200 (the communication processing unit 243) takes a reception signal in which signal elements of codewords of different layers are multiplexed and which is transmitted by radio resources used during the transmission of the codewords from the spatially multiplexed reception signals on the basis of the calculated reception weight matrix W.

Then, the terminal device 200 (the communication processing unit 243) demodulates data of each layer from the taken reception signal on the basis of a codebook for the layer.

(b) Uplink Case

The non-orthogonal multiplexing may be performed in uplink. In this case, the terminal device 200 (the communication processing unit 243) may perform a transmission process for the layer allocated to the terminal device 200 among the plurality of layers. Meanwhile, the base station 100 (the communication processing unit 159) may perform a reception process for the plurality of layers. Note that the above-described low latency uplink corresponds to an example in which the non-orthogonal multiplexing is applied in uplink. In addition, the above-described low latency UL indication may be non-orthogonally multiplexed as described above and transmitted from the terminal device 200 to the base station 100.

(b-1) Transmission Process of Terminal Device 200

Generation of Codeword

The transmission process may include generation of a codeword of the layer allocated to the terminal device 200 from data of the layer. The terminal device 200 (the communication processing unit 243) may generate a codeword of the layer from the data of the layer on the basis of a codebook for the layer.

Layer 1, for example, may be allocated to the terminal device 200A, and the terminal device 200A (the communication processing unit 243) may generate a codeword of Layer 1 from data of Layer 1 on the basis of Codebook 1 illustrated in FIG. 3 (a codebook for Layer 1).

Mapping of Codewords to Radio Resources

The transmission process may include, for example, mapping of the codeword of the layer to a radio resource to be used in transmission of the codeword of the layer allocated to the terminal device 200 (i.e., a radio resource allocated to the terminal device 200).

(b-2) Reception Process of Base Station 100

The reception process may include sequential decoding of data of each of the plurality of layers through SIC. The base station 100 (the communication processing unit 159) may sequentially decode the data of each of the plurality of layers on the basis of codebooks of the plurality of layers.

Layers 1 to 6 may be allocated to, for example, the terminal devices 200A to 200F, and the base station 100 (the communication processing unit 159) may sequentially decode data of each of Layers 1 to 6 through SIC.

5. PROCESS FLOW

Next, an example of a process according to an embodiment of the present disclosure will be described. Note that a process relating to a low latency UL indication (a low latency indication) for using low latency uplink will be focused on in the description.

(1) Basic Process Flow

FIG. 18 is a sequence diagram illustrating, for example, an example of a schematic flow of a process according to an embodiment of the present disclosure. The example illustrated in FIG. 18 is a typical example of a flow of the process relating to the low latency UL indication (a low latency indication) for using low latency uplink.
(Step S301)

The base station 100 reports that low latency uplink is available to the terminal device 200 by transmitting system information to the terminal device 200 present within the cell 101. Accordingly, the terminal device 200 recognizes that low latency uplink is available within the cell 101 on the basis of the system information acquired from the base station 100.

Note that, at this time, the base station 100 may include information regarding a condition for using the low latency uplink in the system information. Accordingly, the terminal device 200 can determine whether the device itself is eligible to use the low latency uplink.
(Step S303)

Next, in a case in which the terminal device 200 uses the low latency uplink, the terminal device transmits a low latency UL indication to the base station 100 (i.e., requests use of the low latency uplink from the base station 100).

Note that, at this time, the terminal device 200 may include information regarding a condition for transmitting data in the low latency uplink in the low latency UL indication. Accordingly, the base station 100 can comprehensively determine whether the terminal device 200 which has reported the low latency UL indication is to be permitted to use the low latency uplink in accordance with a status of each of the terminal devices 200 present within the cell 101. In addition, at this time, the base station 100 can also permit the low latency uplink in a more preferable setting (e.g., with a timer value, a latency level, importance, or the like) with respect to the terminal device 200 which has reported the low latency UL indication in accordance with the status of each of the terminal devices 200 present within the cell 101.

The base station 100 determines whether the terminal device 200 is to be permitted to use the low latency uplink after the low latency UL indication is received from the terminal device 200 present within the cell 101. At this time, the base station 100 may determine whether the terminal device 200 is to be permitted to use the low latency uplink using the low latency UL indication received from the terminal device 200 as reference information.
(Step S305)

Next, in the case in which the base station 100 permits the terminal device 200 to use the low latency uplink, a response thereof to the low latency UL indication is reported to the terminal device 200.

Note that, at this time, the base station 100 may include information for using the low latency uplink in the repose to the low latency UL indication. As a specific example, the base station 100 may also include information indicating a period in which the terminal device 200 is permitted to use the low latency uplink (e.g., a timer value, a frame number, or the like) in the response to the low latency UL indication.

The terminal device 200 can thereafter transmit data to the base station 100 using the low latency uplink.
(Steps S307 and S309)

Then, when new data is generated (S307), the terminal device 200 transmits the new data to the base station 100 using the low latency uplink (S309). Note that, in the case in which information for using the low latency uplink is reported as the response to the low latency UL indication, the terminal device 200 may use the low latency uplink within the range of a condition indicated by the information.
(Step S311)

Then, when the terminal device 200 has transmitted the data to the base station 100, the base station 100 reports an ACK or an NACK to the terminal device 200 depending on whether the base station 100 receives the data with no problem.

The example of the process according to the embodiment of the present disclosure has been described above with reference to FIG. 18.

(2) Modified Examples

The typical example relating to the low latency UL indication (low latency indication) for using low latency uplink has been described above with reference to FIG. 18. Meanwhile, as long as transmission and reception of various kinds of information regarding the low latency UL indication between the base station 100 and the terminal device 200 can be realized, a method thereof is not particularly limited. Thus, an example in which the base station 100 performs transmission and reception of various kinds of information regarding a low latency UL indication to and from the terminal device 200 by using specific control signaling will be described as a modified example.

FIG. 19 is a sequence diagram illustrating, for example, an example of a schematic flow of a process according to a modified example of the embodiment of the present disclosure. Note that the process denoted by reference numeral S401 in FIG. 19 is similar to the process denoted by reference numeral S301 in FIG. 18.
(Step S403)

In the example illustrated in FIG. 19, the terminal device 200 includes a low latency UL indication (low latency indication) as a message in a connection request signal (a radio resource control (RRC) connection request) when connection with the base station 100 has been established.

The base station 100 determines whether the terminal device 200 is to be permitted to use low latency uplink using the low latency UL indication included in the connection request signal as reference information.
(Step S405)

Next, in the case in which the base station 100 permits the terminal device 200 to use the low latency uplink, the base station includes a response to the low latency UL indication (low latency indication) as a message in a response to the connection request signal (RRC Connection Setup).

The terminal device 200 thereafter can transmit data to the base station 100 using the low latency uplink.
(Step S4057)

Upon receiving the response to the connection request signal (RRC Connection Setup), the terminal device 200 transmits a signal indicating that connection has been established (RRC Connection Setup Complete) to the base station 100.

Note that subsequent processes are similar to those in the example described with reference to FIG. 18. That is, the processes denoted by reference numerals S409 to S413 in FIG. 19 correspond to the processes denoted by reference numerals S307 to S311 in FIG. 18.

Figure 20:
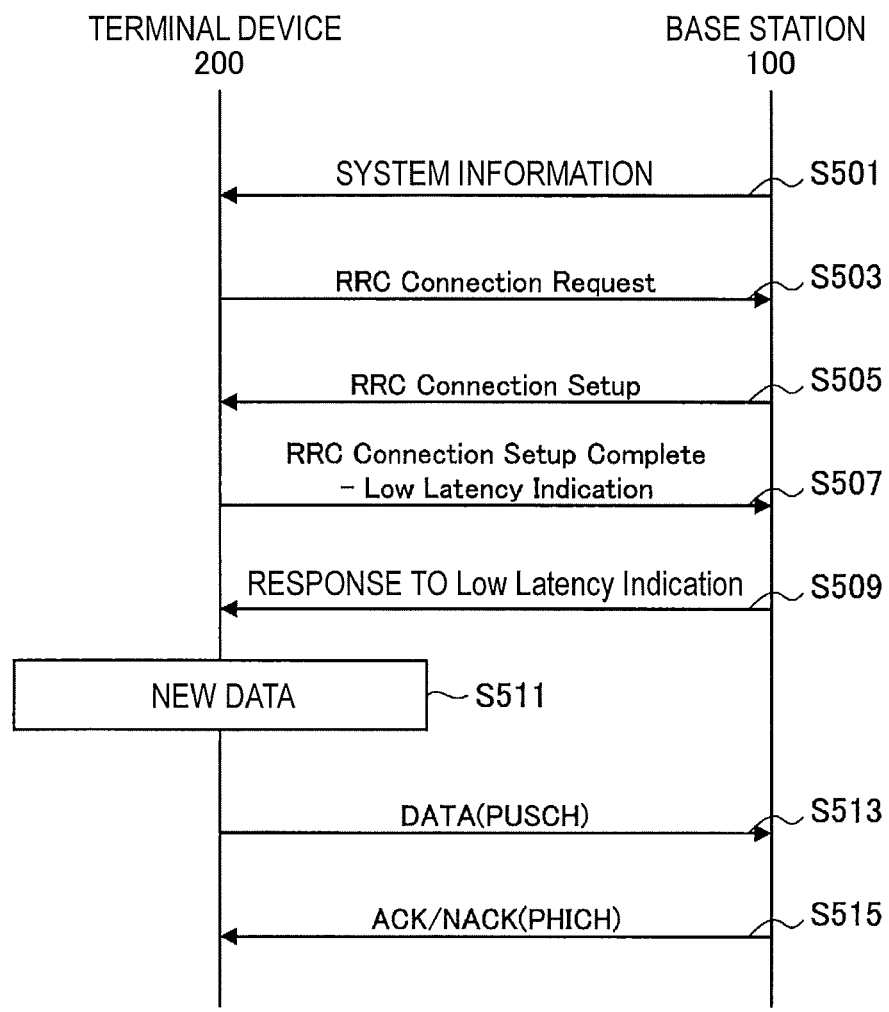
FIG. 20 is a sequence diagram illustrating another example of a schematic flow of a process according to another modified example of the embodiment.

In addition, FIG. 20 is a sequence diagram illustrating another example of a schematic flow of a process according to another modified example of the embodiment of the present disclosure. Note that the process denoted by reference numeral S501 in FIG. 20 is similar to the process denoted by reference numeral S301 in FIG. 18.

(Steps S503 and S505)

The terminal device 200 transmits a connection request signal (RRC Connection Request) to the base station 100 when connection with the base station 100 has been established (S503). Upon receiving the connection request signal from the terminal device 200, the base station 100 transmits a response to the connection request signal (RRC Connection Setup) to the terminal device 200 (S505).

(Step S507)

Upon receiving the response to the connection request signal (RRC Connection Setup), the terminal device 200 transmits a signal indicating that connection with the base station 100 has been established (RRC Connection Setup Complete) to the base station 100. At this time, in the example illustrated in FIG. 20, the terminal device 200 includes a low latency UL indication (low latency indication) as a message in the signal (RRC Connection Setup Complete).

(Step S509)

Next, the base station 100 transmits a response to the low latency UL indication (low latency indication) to the terminal device 200 subsequently to the signal (RRC Connection Setup Complete) indicating that connection with the terminal device 200 has been established.

The terminal device 200 thereafter can transmit data to the base station 100 using low latency uplink.

Note that subsequent processes are similar to those in the example described with reference to FIG. 18. That is, the processes denoted by reference numerals S511 to S515 in FIG. 20 correspond to the processes denoted by reference numerals S307 to S311 in FIG. 18.

The examples in which the base station 100 performs transmission and reception of various kinds of information regarding the low latency UL indication to and from the terminal device 200 by using specific control signaling have been described with reference to FIGS. 19 and 20 as modified examples.

6. APPLICATION EXAMPLES

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<5.1. Application Examples with Regard to Base Station>

First Application Example

Figure 21:
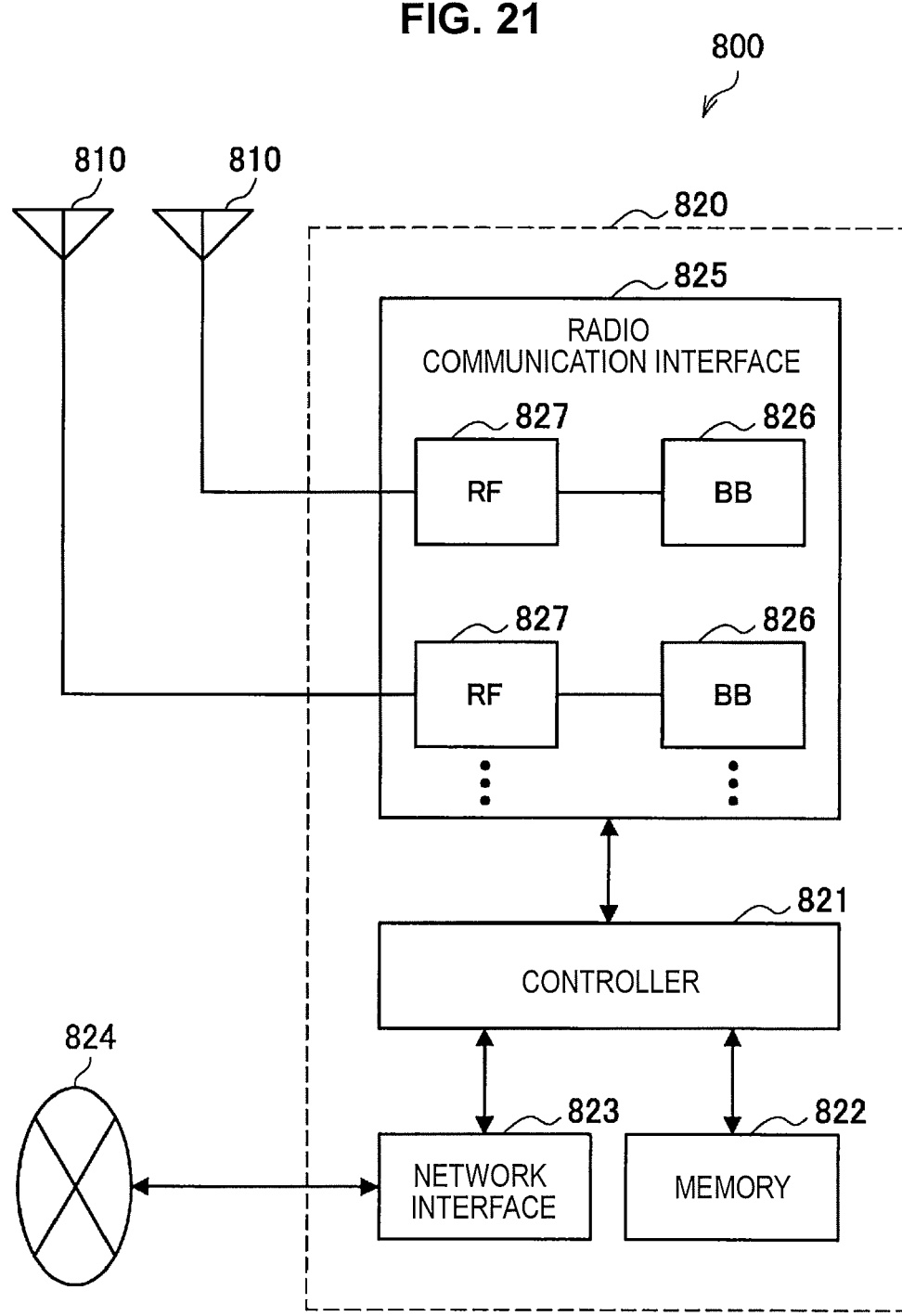
FIG. 21 is a block diagram illustrating a first example of a schematic configuration of an eNB.

FIG. 21 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 21. For example, the multiple antennas 810 may be compatible with multiple frequency bands used by the eNB 800. Although FIG. 21 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 21. For example, the multiple BB processors 826 may be compatible with multiple frequency bands used by the eNB 800. The radio communication interface 825 may include the multiple RF circuits 827, as illustrated in FIG. 21. For example, the multiple RF circuits 827 may be compatible with multiple antenna elements. Although FIG. 21 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 21, one or more structural elements included in the processing unit 150 (the allocation unit 151, the determination unit 153, the information acquisition unit 155, the reporting unit 157, and/or the communication processing unit 159) described with reference to FIG. 8 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 21, the radio communication unit 120 described with reference to FIG. 8 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 22:
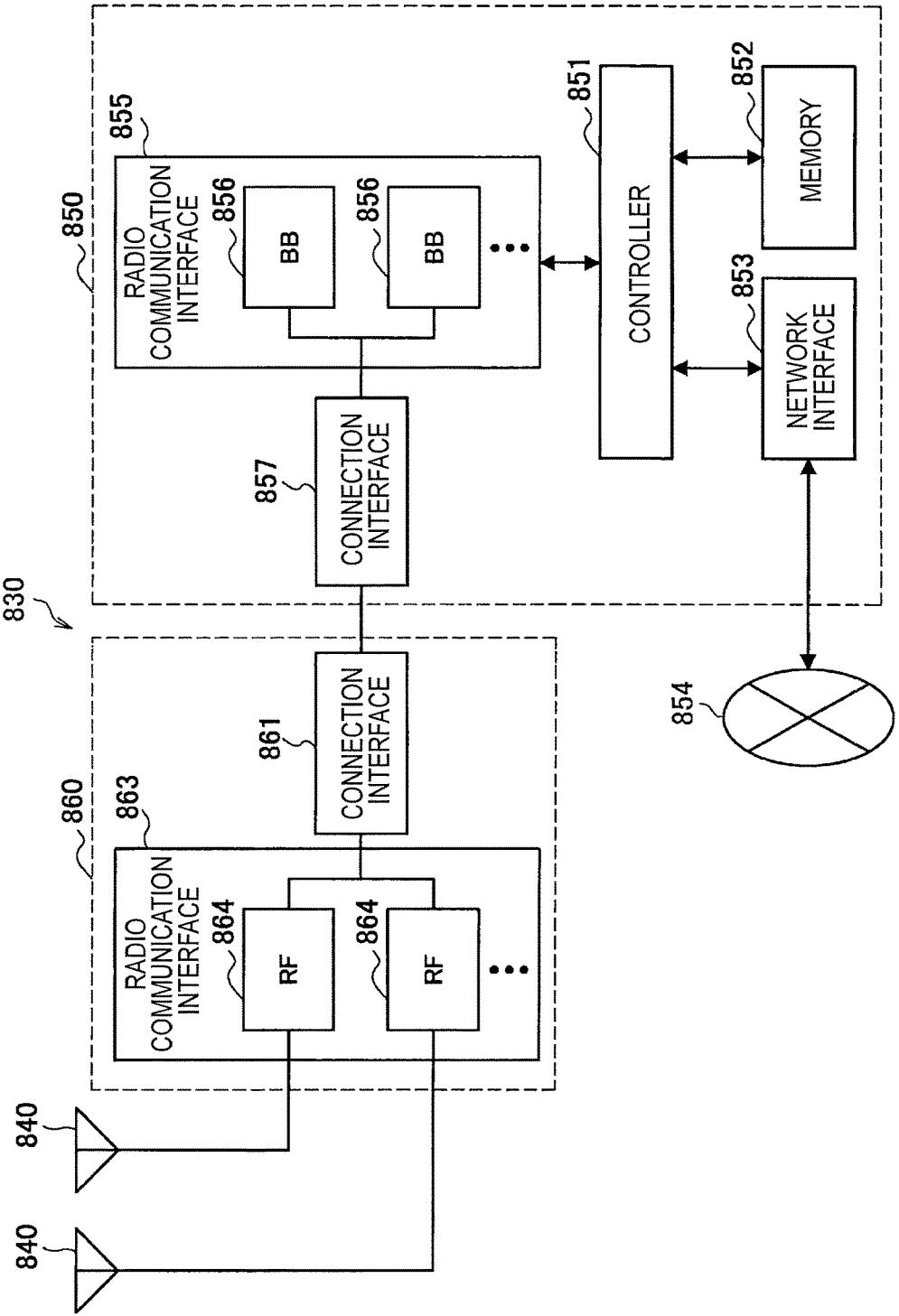
FIG. 22 is a block diagram illustrating a second example of the schematic configuration of the eNB.

FIG. 22 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 22. For example, the multiple antennas 840 may be compatible with multiple frequency bands used by the eNB 830. Although FIG. 22 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 21.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 21, except the BB processor 856 is connected to the RF circuit 864 of the RRH 860 via the connection interface 857. The radio communication interface 855 may include the multiple BB processors 856, as illustrated in FIG. 22. For example, the multiple BB processors 856 may be compatible with multiple frequency bands used by the eNB 830. Although FIG. 22 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 22. For example, the multiple RF circuits 864 may support multiple antenna elements. Although FIG. 22 illustrates the example in which the radio communication interface 863 includes the multiple RF circuits 864, the radio communication interface 863 may also include a single RF circuit 864.

In the eNB 830 shown in FIG. 22, one or more structural elements included in the processing unit 150 (the allocation unit 151, the determination unit 153, the information acquisition unit 155, the reporting unit 157, and/or the communication processing unit 159) described with reference to FIG. 8 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

In addition, in the eNB 830 shown in FIG. 22, the radio communication unit 120 described, for example, with reference to FIG. 8 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

<5.2. Application Examples with Regard to Terminal Device>

First Application Example

Figure 23:
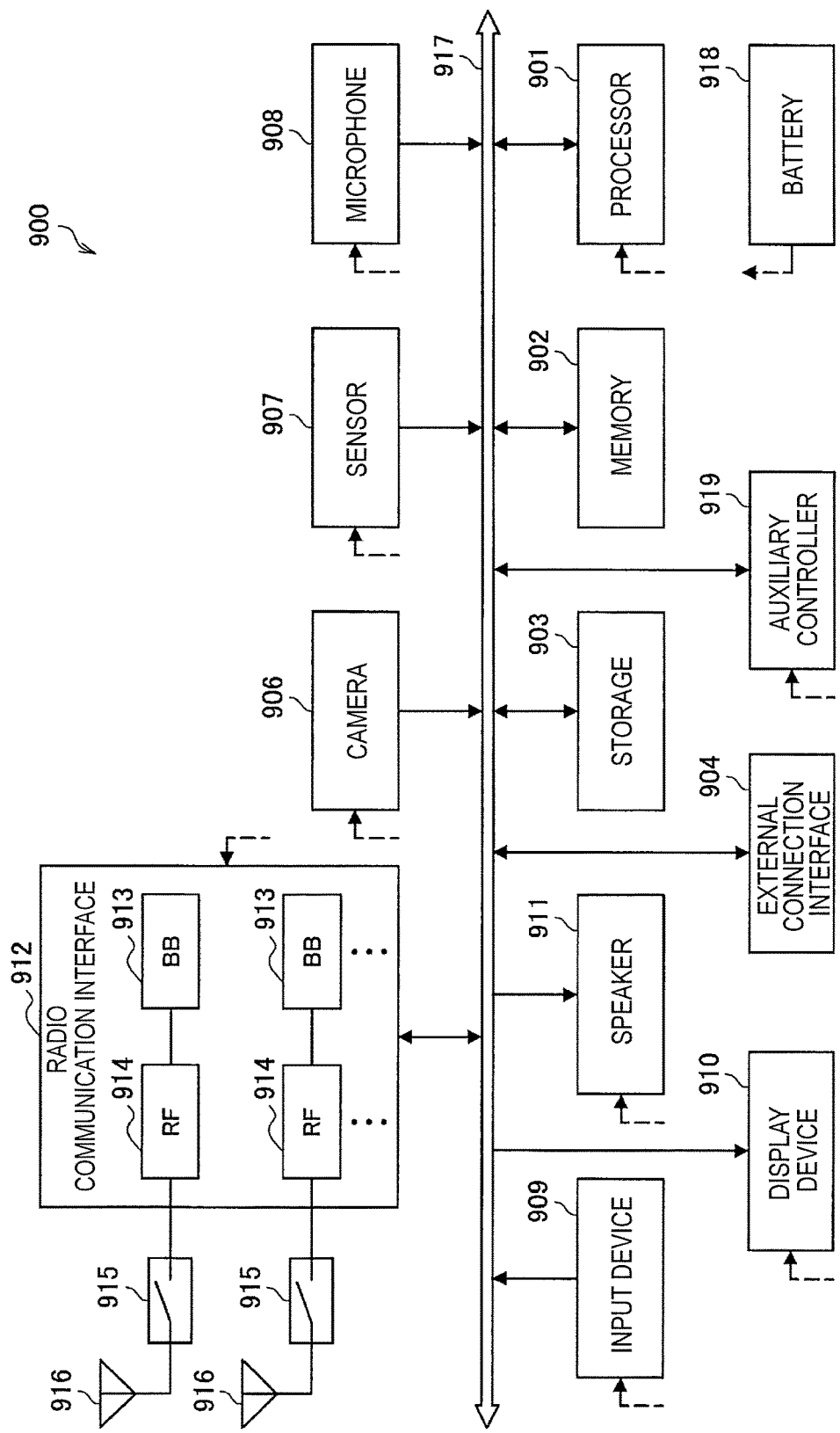
FIG. 23 is a block diagram illustrating an example of a schematic configuration of a smartphone.

FIG. 23 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 23. Although FIG. 23 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in a MIMO antenna), and is used for the radio communication interface 912 to transmit and receive radio signals. The smartphone 900 may include the multiple antennas 916, as illustrated in FIG. 23. Although FIG. 23 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 23 via feeder lines, which are partially shown as dashed lines in the figure. The auxiliary controller 919 operates a minimum necessary function of the smartphone 900, for example, in a sleep mode.

In the smartphone 900 shown in FIG. 23, the information acquisition unit 241 and the communication processing unit 243 described with reference to FIG. 9 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

In addition, in the smartphone 900 shown in FIG. 23, the radio communication unit 220 described, for example, with reference to FIG. 9 may be implemented by the radio communication interface 912 (for example, the RF circuit 914). Moreover, the antenna unit 210 may be implemented by the antenna 916.

Second Application Example

Figure 24:
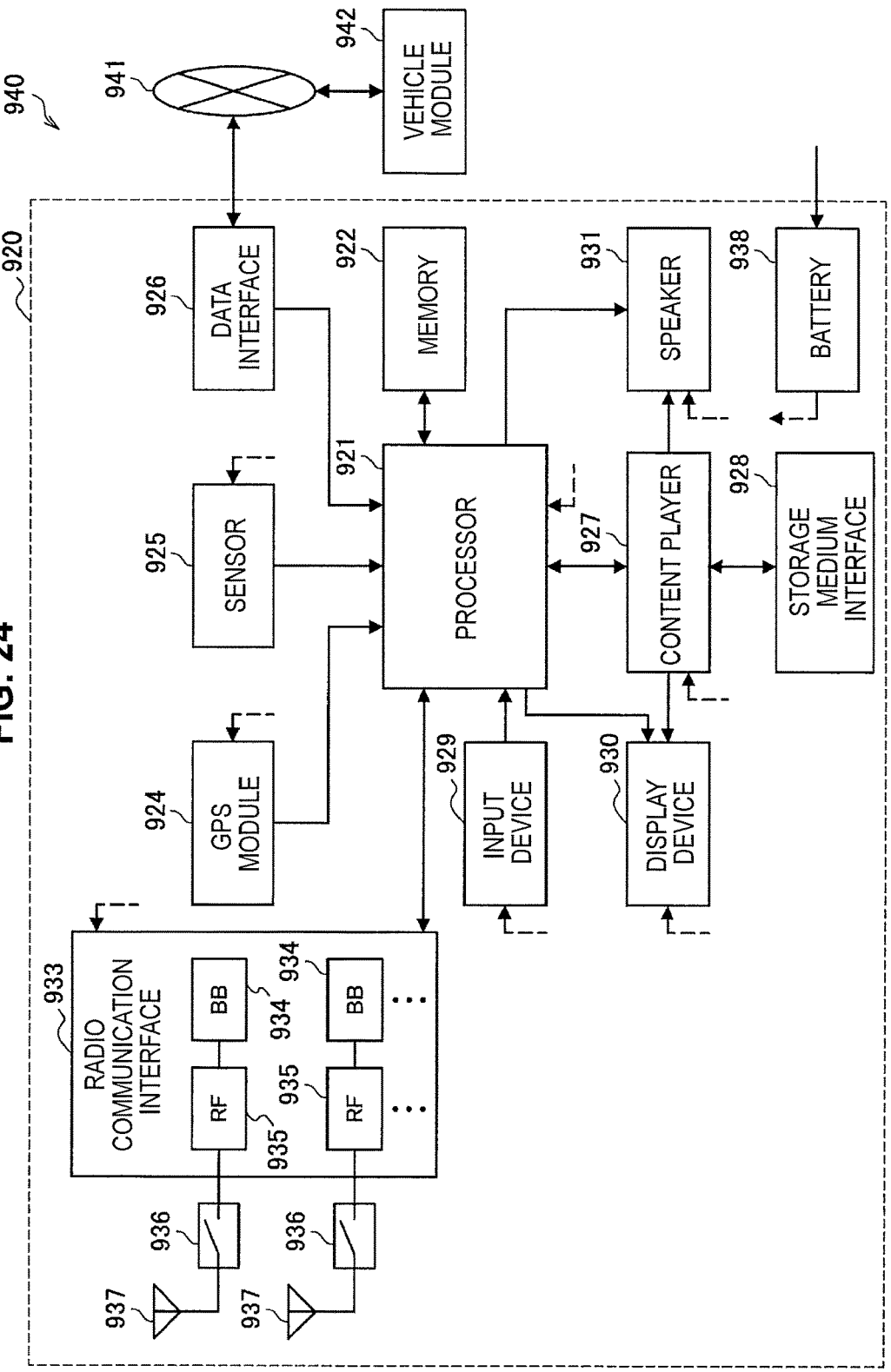
FIG. 24 is a block diagram illustrating an example of a schematic configuration of a car navigation device.

FIG. 24 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 24. Although FIG. 24 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 24. Although FIG. 24 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 24 via feeder lines that are partially shown as dashed lines in the figure. The battery 938 accumulates power supplied form the vehicle.

In the car navigation device 920 shown in FIG. 24, the information acquisition unit 241 and the communication processing unit 243 described with reference to FIG. 9 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the car navigation device 920, and the radio communication interface 933 (for example, the BB processor 934) and/or the controller 921 may execute the program. As described above, the car navigation device 920 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

In addition, in the car navigation device 920 shown in FIG. 24, the radio communication unit 220 described, for example, with reference to FIG. 9 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and the communication processing unit 243. The vehicle module 942 generates vehicle data such as vehicle speed, engine speed, and trouble information, and outputs the generated data to the in-vehicle network 941.

7. CONCLUSION

Devices and processes according to embodiments of the present disclosure have been described above with reference to FIGS. 7 to 24.

According to the embodiments of the present disclosure, the base station 100 reports that low latency uplink is available to the terminal device 200 present within the cell 101 by transmitting the system information thereto. With this configuration, the terminal device 200 can recognize that low latency uplink is available within the cell 101 on the basis of the system information transmitted from the base station 100.

In addition, in a case in which the terminal device 200 uses low latency uplink, the terminal device transmits a low latency UL indication to the base station 100. After the low latency UL indication is received from the terminal device 200 present within the cell 101, the base station 100 determines whether the terminal device 200 is eligible to use low latency uplink. Then, in the case in which the base station 100 permits the terminal device 200 to use low latency uplink, the base station reports a response to the low latency UL indication. With this configuration, the base station 100 can recognize the terminal device 200 present within the cell 101 desiring use of low latency uplink and permit only the specific terminal device 200 to use low latency uplink.

In addition, the base station 100 may report the information regarding a condition for using low latency uplink as the system information. With this configuration, the terminal device 200 can determine whether the terminal device can be a subject of low latency uplink, and also determine whether the low latency UL indication is to be transmitted to the base station 100 in accordance with the determination result. With this configuration, a load on a network caused by transmission of the low latency UL indication from the terminal device 200 to the base station 100 can be reduced.

Furthermore, the terminal device 200 may report information regarding a condition for transmitting data using low latency uplink as the low latency UL indication. Accordingly, the base station 100 can determine whether the terminal device 200 is to be permitted to use low latency uplink on the basis of the reported condition. In addition, at this time, the base station 100 can also permit the terminal device 200 to use low latency uplink in a more preferable setting on the basis of the reported condition.

Furthermore, in the case in which the base station 100 permits the terminal device 200 to use low latency uplink, the base station may report information for using low latency uplink to the terminal device 200 as a response to the low latency UL indication. Accordingly, the terminal device 200 can transmit data to the base station 100 using low latency uplink within a range permitted by the base station 100 on the basis of the reported information.

The preferred embodiment(s) of the present disclosure has/have been described above with reference to the accompanying drawings, whilst the present disclosure is not limited to the above examples. A person with common knowledge in the technical field of the present disclosure may find various alterations and modifications within the scope of the appended claims, and it should be understood that they will naturally come under the technical scope of the present disclosure.

Processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the allocation unit, the selection unit, the information acquisition unit, the reporting unit, and/or the communication processing unit) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the allocation unit, the selection unit, the information acquisition unit, the reporting unit, and/or the communication processing unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

a communication unit configured to perform radio communication; and a control unit configured to perform control such that control information is transmitted from the communication unit to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

(2)

The device according to (1), in which the uplink resource in which the communication scheme is available do not overlap an uplink resource allocated in accordance with a scheduling request made by the terminal.

(3)

The device according to (1) or (2), in which the control unit performs control such that information for designating the uplink resource in which the communication scheme is available is transmitted from the communication unit to a terminal.

(4)

The device according to any one of (1) to (3), in which, after first information is transmitted to the terminal as the control information indicating that the communication scheme is available and second information is acquired from the terminal, the control unit performs control such that third information for using the communication scheme is transmitted from the communication unit to the terminal.

(5)

The device according to (4), in which the control unit determines whether to permit the terminal to use the communication scheme on the basis of the second information acquired from the terminal, and performs control such that the third information is transmitted from the communication unit to the terminal in the case in which the terminal is permitted to use the communication scheme.

(6)

The device according to (4) or (5), in which the control unit performs control such that information regarding a period in which use of the communication scheme is permitted is transmitted from the communication unit to the terminal as the third information.

(7)

The device according to any one of (4) to (6), in which the control unit acquires information regarding a condition for transmitting the data on the basis of the communication scheme as the second information.

(8)

The device according to any one of (1) to (7), in which the control unit performs control such that information regarding a condition for using the communication scheme is transmitted from the communication unit to the terminal as information indicating that the communication scheme is available.

(9)

The device according to (8), in which the control unit performs control such that information regarding a restriction on use of the communication scheme is transmitted from the communication unit to the terminal as the control information.

(10)

A device including:

a communication unit configured to perform radio communication; and an acquisition unit configured to acquire control information from a base station via the radio communication, the control information indicating that a communication scheme in which data non-orthogonally multiplexed for a plurality of layers is demodulated through cancellation of interference between the layers and in which the data is transmitted from a terminal to the base station through a predetermined uplink resource, is available.

(11)

The information processing device according to (10), including:

a control unit configured to perform control such that, after first information is acquired as the control information indicating that the communication scheme is available, second information for requesting use of the communication scheme is transmitted from the communication unit to the base station.

(12)

The device according to (11), in which the control unit performs control such that information regarding a condition for transmitting the data from the terminal to the base station on the basis of the communication scheme is transmitted from the communication unit to the base station as the second information.

(13)

The device according to (11) or (12), in which, after the second information is transmitted to the base station, the acquisition unit acquires third information for using the communication scheme from the base station.

(14)

The device according to (13), in which the acquisition unit acquires information regarding a period in which use of the communication scheme is permitted as the third information, and the control unit performs control such that the data is transmitted from the communication unit to the base station within the period on the basis of the communication scheme.

(15)

The device according to any one of (11) to (14), in which the acquisition unit acquires information regarding a condition for using the communication scheme as the first information, and the control unit performs control such that the second information is transmitted from the communication unit to the base station in accordance with the acquired information regarding the condition for using the communication scheme.

(16)
A method including:
performing radio communication; and
performing control, by a processor, such that control information is transmitted to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

(17)
A method including:
performing radio communication; and
acquiring, by a processor, control information from the base station via the radio communication, the control information indicating that a communication scheme in which data non-orthogonally multiplexed for a plurality of layers is demodulated through cancellation of interference between the layers and in which the data is transmitted from a terminal to a base station through a predetermined uplink resource, is available.

(18)
A program causing a computer to perform:
radio communication; and
control such that control information is transmitted to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available.

(19)
A program causing a computer to perform:
radio communication; and
acquisition of control information from a base station via the radio communication, the control information indicating that a communication scheme in which data non-orthogonally multiplexed for a plurality of layers is demodulated through cancellation of interference between the layers and in which the data is transmitted from a terminal to the base station through a predetermined uplink resource, is available.

REFERENCE SIGNS LIST 1 system
100 base station
101 cell
110 antenna unit
120 radio communication unit
130 network communication unit
140 storage unit
150 processing unit
151 allocation unit
153 determination unit
155 information acquisition unit
157 reporting unit
159 communication processing unit
200 terminal device
210 antenna unit
220 radio communication unit
230 storage unit
240 processing unit
241 information acquisition unit
243 communication processing unit

The invention claimed is:

1. A device comprising:
communication circuitry configured to perform radio communication; and
a controller configured to perform control such that control information is transmitted from the communication circuitry to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available;
wherein after first information is transmitted to the terminal as the control information indicating that the communication scheme is available and second information is acquired from the terminal, the controller performs control such that third information for using the communication scheme is transmitted from the communication circuitry to the terminal.

2. The device according to claim 1, wherein the uplink resource in which the communication scheme is available do not overlap an uplink resource allocated in accordance with a scheduling request made by the terminal.

3. The device according to claim 1, wherein the
controller performs control such that information for designating the uplink resource in which the communication scheme is available is transmitted from the communication circuitry to a terminal.

4. The device according to claim 1, wherein the controller
determines whether to permit the terminal to use the communication scheme on the basis of the second information acquired from the terminal, and
performs control such that the third information is transmitted from the communication circuitry to the terminal in the case in which the terminal is permitted to use the communication scheme.

5. The device according to claim 1, wherein the controller performs control such that information regarding a period in which use of the communication scheme is permitted is transmitted from the communication circuitry to the terminal as the third information.

6. The device according to claim 1, wherein the controller acquires information regarding a condition for transmitting the data on the basis of the communication scheme as the second information.

7. The device according to claim 1, wherein the controller performs control such that information regarding a condition for using the communication scheme is transmitted from the communication circuitry to the terminal as information indicating that the communication scheme is available.

8. The device according to claim 7, wherein the controller performs control such that information regarding a restriction on use of the communication scheme is transmitted from the communication circuitry to the terminal as the control information.

9. A device comprising:
communication circuitry configured to perform radio communication; and
a receiver configured to acquire control information from a base station via the radio communication, the control information indicating that a communication scheme in which data non-orthogonally multiplexed for a plurality of layers is demodulated through cancellation of interference between the layers and in which the data is transmitted from a terminal to the base station through a predetermined uplink resource, is available;

a controller configured to perform control such that, after first information is acquired as the control information indicating that the communication scheme is available, second information for requesting use of the communication scheme is transmitted from the communication circuitry to the base station.

10. The device according to claim 9, wherein the controller performs control such that information regarding a condition for transmitting the data from the terminal to the base station on the basis of the communication scheme is transmitted from the communication circuitry to the base station as the second information.

11. The device according to claim 9, wherein, after the second information is transmitted to the base station, the receiver acquires third information for using the communication scheme from the base station.

12. The device according to claim 11,
wherein the receiver acquires information regarding a period in which use of the communication scheme is permitted as the third information, and
the controller performs control such that the data is transmitted from the communication circuitry to the base station within the period on the basis of the communication scheme.

13. The device according to claim 9, wherein the receiver acquires information regarding a condition for using the communication scheme as the first information, and
the controller performs control such that the second information is transmitted from the communication circuitry to the base station in accordance with the acquired information regarding the condition for using the communication scheme.

14. A method comprising: performing radio communication; and
performing control, by a processor, such that control information is transmitted to a terminal, the control information indicating that a communication scheme in which data non-orthogonally multiplexed for a plurality of layers is demodulated through cancellation of interference between the layers and in which the data is transmitted from the terminal to a base station through a predetermined uplink resource, is available;
wherein, after first information is transmitted to the terminal as the control information indicating that the communication scheme is available and second information is acquired from the terminal, performing control such that third information for using the communication scheme is transmitted from the communication circuitry to the terminal.

* * * * *